(12) United States Patent
Kato

(10) Patent No.: US 6,606,799 B2
(45) Date of Patent: Aug. 19, 2003

(54) ELECTRONIC AZIMUTH METER AND ELECTRONIC TIME PIECE HAVING ELECTRONIC AZIMUTH METER

(75) Inventor: Kazuo Kato, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/737,902

(22) Filed: Dec. 15, 2000

(65) Prior Publication Data

US 2001/0043155 A1 Nov. 22, 2001

(30) Foreign Application Priority Data

Jan. 25, 2000 (JP) .................................... 2000-015998
Aug. 1, 2000 (JP) .................................... 2000-233037

(51) Int. Cl.$^7$ .............................................. G01C 17/38
(52) U.S. Cl. ......................... 33/356; 33/333; 33/355 R; 33/357
(58) Field of Search ...................... 33/356, 333, 355 R, 33/357, 334, 354

(56) References Cited

U.S. PATENT DOCUMENTS

| | | | |
|---|---|---|---|
| 4,668,100 A | | 5/1987 | Murakami et al. ............ 368/10 |
| 5,151,872 A | * | 9/1992 | Suzuki et al. ................. 33/356 |
| 5,175,936 A | * | 1/1993 | Sato ............................. 33/354 |
| 5,550,794 A | * | 8/1996 | Born et al. .................... 33/271 |
| 5,596,551 A | | 1/1997 | Born et al. .................... 368/10 |
| 5,689,185 A | * | 11/1997 | Widdershhoven et al. .. 324/252 |
| 5,697,162 A | * | 12/1997 | Bornand et al. .............. 33/352 |
| 5,883,861 A | * | 3/1999 | Moser et al. .................. 33/334 |
| 5,952,825 A | * | 9/1999 | Wan ............................. 324/252 |

FOREIGN PATENT DOCUMENTS

| | | | | |
|---|---|---|---|---|
| CH | 613832 A | * | 6/1977 | .................. 33/354 |
| FR | 2631115 A1 | * | 11/1989 | ............... 33/355 R |
| GB | 2130729 | | 6/1984 | |

OTHER PUBLICATIONS

Patent Abstracts of Japan, vol. 2000, No. 04, Aug. 31, 2000, publication No. 2000009467, publication date Jan. 14, 2000.

* cited by examiner

Primary Examiner—Diego Gutierrez
Assistant Examiner—Travis Reis
(74) Attorney, Agent, or Firm—Adam & Wilks

(57) ABSTRACT

An electronic azimuth meter includes an electronic azimuth meter main body and X-direction and Y-direction magnetic sensors for detecting magnetic field components in orthogonal two directions of the main body, the main body includes a magnetic part magnetized by geomagnetism B0 for forming a magnetic field having components in oblique directions relative to directions of the geomagnetism at locations of the magnetic sensors, approximate equation storing means for storing pluralities with regard to respective directions X, Y, of approximate equations calculated based on magnetic field detected values Vx and Vy of the magnetic sensors with regard to a number of azimuths of the azimuth meter in geomagnetism having magnetic field components Bx and By, which are approximate equations representing relationships between the detected values Vx and Vy of the magnetic sensors and the magnetic field components Bx and By of the geomagnetism, and azimuth calculating means for calculating azimuth by selecting specific approximate equations in the pluralities of approximate equations with regard to the respective directions X, Y based on the detected values Vx, Vy of the magnetic sensors.

25 Claims, 18 Drawing Sheets

ELECTRONIC AZIMUTH METER AND ELECTRONIC TIME PIECE HAVING ELECTRONIC AZIMUTH METER

BACKGROUND OF THE INVENTION

1. Field of the Invention

The present invention relates to an electronic azimuth meter for calculating azimuth by detecting magnetic field of the geomagnetism by a magnetic sensor such as a magneto-resistive element.

2. Description of the Prior Art

According to an electronic azimuth meter, there is a concern in which a magnetic field generated at a location of a magnetic sensor is shifted from the magnetic field produced by the geomagnetism owing to the fact that a case of a battery normally comprising stainless steel such as SUS 304, or the like becomes more or less ferromagnetic by cold forming or the like and produces a magnetic field constituting noise in the geomagnetism. There has been a proposal per se for correcting an error by such noise by a correction table or the like (for example, Japanese Patent Laid-Open No. 170663/1998). According to technology proposed by the publication, actually, in order to correct errors in two orthogonal directions X and Y in a horizontal face, with regard to azimuth angle θ, a correction calculating equation in the form of $\cos(2\theta)$ is used and in the case in which the magnetic sensor can be arranged to separate from a battery having an outer shape substantially in a circular plate shape to some degree, the technology is regarded as appropriate qualitatively. Further, it is described in Japanese Patent Laid-Open No. 300869/1994 (Table 1 and FIG. 13 of the publication) that in order to avoid an electronic part which is easy to bear magnetism or magnetize such as a case of a battery from effecting magnetic influence on a magnetic sensor, the electronic part which is easy to bear magnetism or magnetize is made remote from the magnetic sensor and a minimum limit distance which does not effect the magnetic influence is 2 cm (0.02 m) from an edge in the case of, for example, a sliver oxide battery.

However, the inventors have confirmed by experiment that when a case of a main body of an electronic azimuth meter is made as small as possible and a maximum size one is used for a battery, a distance between a magnetic part such as a case of the battery and a magnetic sensor is reduced and in an azimuth in which although a geomagnetic component in X (or Y) direction stays the same, a geomagnetic component in Y (or X) direction differs, an output of an X (or Y)-direction magnetic sensor, that is, a magnetic field detected value in X (or Y) direction by the magnetic sensor, in other words, an X (or Y) direction component of magnetic field formed at a location of the magnetic sensor differs.

SUMMARY OF THE INVENTION

The present invention has been carried out in view of the above-described point and it is an object thereof to provide an electronic azimuth meter which is compact and is capable of accurately measuring azimuth and an electronic time piece having the electronic azimuth meter.

In order to achieve the above-described object, according to an aspect of the invention, there is provided an electronic azimuth meter which is an electronic azimuth meter having an electronic azimuth meter main body and X-direction and Y-direction magnetic sensors for detecting magnetic field components of two orthogonal directions of X and Y of the main body, the electronic azimuth meter main body comprising a magnetic part forming at locations of the X-direction and the Y-direction magnetic sensors, magnetic fields Bmx and Bmy by being magnetized by geomagnetism and having components in oblique directions relative to a direction of the geomagnetism specified by magnetic field components Bx and By in an X-Y plane, approximate equation storing means for storing with regard to the respective directions of X and Y, pluralities of approximate equations calculated based on magnetic field detected values Vx and Vy of the X-direction and the Y-direction magnetic sensors with regard to a number of azimuths of the azimuth meter in the geomagnetism having the magnetic field components Bx and By, which are approximate equations (for example, Vxi (Bx, By), Vyj (Bx, By) or Bxi (Vx, Vy), Byj (Vx, Vy)) representing relationships between the detected values Vx and Vy of the magnetic sensors and the magnetic field components Bx and By of the geomagnetism, and azimuth calculating means for calculating the azimuth of the azimuth meter main body by selecting specific approximate equations in the pluralities of approximate equations with regard to the respective directions of X and Y based on the detected values Vx and Vy of the X-direction and the Y-direction magnetic sensors.

According to the electronic azimuth meter of the invention, there are provided "approximate equation storing means for storing with regard to the respective directions of X and Y, pluralities of approximate equations calculated based on magnetic field detected values Vx and Vy of the X-direction and the Y-direction magnetic sensors with regard to a number of azimuths of the azimuth meter in the geomagnetism having the magnetic field components Bx and By, which are approximate equations (for example, Vxi (Bx, By), Vyj (Bx, By) or Bxi (Vx, Vy), Byj (Vx, Vy)) representing relationships between the detected values Vx and Vy of the magnetic sensors and the magnetic field components Bx and By of the geomagnetism, and azimuth calculating means for calculating the azimuth of the azimuth meter main body by selecting specific approximate equations in the pluralities of approximate equations (for example, Vxi (Bx, By), Vyj (Bx, By) or Bxi (Vx, Vy), Byj (Vx, Vy)) with regard to the respective directions of X and Y based on the detected values Vx and Vy of the X-direction and the Y-direction magnetic sensors" and therefore, even when there is provided "a magnetic part forming at locations of the X-direction and the Y-direction magnetic sensors, magnetic fields Bmx and Bmy by being magnetized by geomagnetism and having components in oblique directions relative to a direction of the geomagnetism specified by magnetic field components Bx and By in an X-Y plane", influence by the magnetic part can be removed, the geomagnetic components of the geomagnetism can be detected and the azimuth of the azimuth meter can be calculated accurately. In this case, in order to calculate accurate azimuth, it is not necessary to know what noise magnetic field is formed by which part.

Therefore, according to the electronic azimuth meter of the invention, the magnetic part can be arranged in a state of being proximate to the magnetic sensor. That is, according to the electronic azimuth meter of the invention, a magnetic part such as a case of a battery typically comprising SUS 304 and easy to include more or less a ferromagnetic phase by a forming step, can be arranged to be proximate to the magnetic sensor and therefore, not only the size of the azimuth meter main body can be minimized but also a battery having a maximum capacity capable of being contained in the case can also be used and the electronic azimuth meter can be made compact and operable for a long period of time.

The electronic azimuth meter is provided with the X-direction and the Y-direction magnetic sensors for detecting respective geomagnetic components in two orthogonal directions of X and Y. The electronic azimuth meter is directed horizontally such that the magnetic field in the horizontal face can be detected by the X-direction and the Y-direction magnetic sensors. In this case, horizontally directing the electronic azimuth meter signifies directing the electronic azimuth meter in directions by which an X-Y plane becomes horizontal and the magnetic sensors detect the magnetic field in the horizontal face.

The magnetic field by the geomagnetism or the geomagnetism Bx, By and Bz differs according to locations on the earth. Strictly speaking, the magnetic field is varied over time. In the case of Japan, at a vicinity of Tokyo, horizontal magnetic force (magnitude of magnetic field (strictly speaking, "magnetic flux density") component in a horizontal face of geomagnetism) $\{(Bx)^2+(By)^2\}^{1/2}$, is about 30 $\mu$T, that is, $30\times10^{-6}$ T and a direction of the horizontal magnetic force of the geomagnetism is inclined to west by about 6 degree at a vicinity of Tokyo relative to the north direction of the horizontal plane (declination is about 6 degree to west side). Further, dip of the geomagnetism is about 50 degree at a vicinity of Tokyo. Further, in this specification, unless particularly specified otherwise, the term of "magnetic field" is used as a definition the same as that of "magnetic flux density" and the term in the case inherently indicating "magnetic flux density" is referred to as "magnetic field". In representing the term, not H but B is used.

In this specification, a "magnetic part" is referred to as a part or a portion thereof comprising a material which can be magnetized more than a material of so-to-speak feeble magnetism such as normal paramagnetism or diamagnetism and typically indicates a part partially including a paramagnetic martensitic phase produced by cold-forming SUS 304. Although not so much preferable, naturally, a total of a part may be made of a typical paramagnetic material such as iron, steel or nickel in so-to-speak martensitic phase.

Under the magnetic field by the geomagnetism, a magnetic part is more or less magnetized and magnetic fields Bmx and Bmy produced by magnetizing the magnetic part are superposed on the horizontal magnetic forces Bx and By and magnetic fields Bxa=Vx, Bya=Vy are formed at locations of the X-direction and the Y-direction magnetic sensors. In this case, influence of all the magnetic part is Bmx=Bxa−Bx and Bmy=Bya−By. However, at least any of a spacial distribution of the magnetic part, that is, a position and a shape and a degree of easiness of magnetization (initial magnetic permeability or magnetic susceptibility at a vicinity of zero magnetic field) and the like, is not normally uniform and therefore, when the magnetic part and the magnetic sensor are disposed to be comparatively proximate to each other, even when a geomagnetic component in X (or Y) direction is the same, in an azimuth in which a geomagnetic component in Y (or X) direction differs, an output of an X (or Y)-direction magnetic sensor, that is, a magnetic field detected value Vx (or Vy) in X (or Y) direction by the magnetic sensor, in other words, an X (or Y) direction component Bxa (or Bya) formed at a location of the magnetic sensor differs. Further, although the scope of the invention is not limited, it seems that the direction of the geomagnetism is provided with large dip and therefore, the vertical direction component of the geomagnetism depends on the above-described nonuniformity of the magnetic part and can form the magnetic field in the horizontal face asymmetrical to inversion of the geomagnetism at the location of the magnetic sensor. At any rate, the geomagnetic part is magnetized by the geomagnetism and forms the magnetic fields Bmx and Bmy having components in oblique directions relative to the direction of the geomagnetism specified by the magnetic field components Bx and By in the X-Y plane at locations of the X-direction and the Y-direction magnetic sensors. Therefore, azimuth dependencies of the magnetic field Bmx formed at the location of the X-direction magnetic sensor by the magnetic part and the magnetic field Bmy formed at the location of the Y-direction magnetic sensor, generally differ from each other even when influence of deviation of 90 degree in X and Y directions is removed. However, depending on cases, the dependencies may actually be the same.

As a result, according to the electronic azimuth meter of the invention, even when while changing the azimuth of the azimuth meter, the horizontal magnetic force, that is, the magnetic field detected values Vx and Vy of the X-direction and the Y-direction magnetic sensors are measured in the geomagnetism of the magnetic field components Bx and By and plotted by orthogonal coordinates Bx–Vx or By–Vy, Vx=Vx (Bx) (or Bx=Bx (Vx)) and Vy=Vy (By) (or By=By (Vy)) are not constituted in a linear shape but in a closed curve shape. Therefore, based on data provided by actual measurement, Vx=Vx (Bx) (or Bx=Bx (Vx)) and Vy=Vy (By) (or By=By (Vy)) are calculated in the form of approximate equations.

According to a first preferable embodiment of the invention, typically, the approximate equations comprise two equations of Vx1 (Bx) and Vx2 (Bx) (or Bx1 (Vx) and Bx2 (Vx)) and Vy1 (By) and Vy2 (By) (or By1 (Vx) and By2 (Vx)) to separately represent an upper half and a lower half of the closed curve by defining i=1, 2 and j=1, 2 such that there are formed one-valued functions in which respectives of Bx and Vx and By and Vy correspond to each other in a one-to-one relationship. Naturally, when the influence of the noise magnetic fields Bmx and Bmy by the magnetic part is significant and is complicatedly dependent upon the azimuth, with regard to at least one of them, the approximate equation may be divided into three or more areas and approximate equations of the respective areas may be calculated.

Meanwhile, according to a second preferable embodiment of the invention, based on new knowledge that the above-described closed curve can be represented by the form of Bx=Bx[cos$\{\beta x(\alpha x(Vx))+\delta x\}$] and By=By[sin$\{\beta y(\alpha y(Vy))+\delta y\}$], approximate equations are calculated. Further, $\beta x(\alpha x(Vx))$ and $\beta y(\alpha y(Vy))$ are divided into a plurality of areas in accordance with a relationship provided by $\beta x$ with regard to the maximum value $Vx_M$ and the minimum value $Vx_m$ of the magnetic field detected value Vx of the X-direction magnetic sensor as well as a relationship provided by $\beta y$ with regard to the maximum value $Vy_M$ and the minimum value $Vy_m$ of the magnetic field detected value Vy of the Y-direction magnetic sensor and are represented by relationships in the respective areas. With regard to the second embodiment, a summarized explanation will later be given and in the following, an explanation will be given of characteristics common to the first and the second embodiments and characteristics with regard to the first embodiment.

In the case in which the horizontal magnetic forces Bx and By are calculated from the detected values Vx and Vy of the magnetic sensors, when predetermined approximate equations are selected from pluralities of approximate equations with regard to respective directions of X and Y, the approximate equations are selected in accordance with division or section references for dividing pluralities of approximate sections or approximate areas. In dividing the approximate areas, typically, with regard to the respectives of the X direction and the Y direction, a direction or an azimuth maximizing or minimizing a detected output constitutes a boundary of division.

According to the first embodiment, with regard to the boundary, approximately, in respect of Vx, typically, locations where the azimuth is 0 degree (direction in which direction of horizontal magnetic force and X direction coincide with each other) and 180 degree (direction in which direction of horizontal magnetic force and X direction are opposed to each other) constitute boundaries and in respect of Vy, typically, locations where the azimuth is 90 degree (direction in which direction of horizontal magnetic force and Y direction coincide with each other) and 270 degree (direction in which direction of horizontal magnetic force and Y direction are opposed to each other) constitute the boundaries. Therefore, the approximate areas are partitioned typically at locations of four azimuths of east, west, south and north of the geomagnetism. That is, with regard to one direction of the X direction and the Y direction, the approximate area is divided by north azimuth (0 degree) and south azimuth (180 degree) and with regard to other direction, the approximate area is divided by west (90 degree) and east (270 degree).

According to the specification, unless not particularly specified otherwise, the azimuth or the azimuth angle is represented by notation φ and is represented such that north is 0 degree, west is 90 degree, south is 180 degree and east is 270 degree. With regard to geographical "azimuth angle", the angle is represented by notation θ and is described as display azimuth angle. Further, $\phi+\theta=360°$.

Further, generally, although Vx and Vy depend both of Bx and By in the form of Vx=Vx (Bx, By) and Vy=Vy (Bx, By), as mentioned above, Bx and By designate two components of the horizontal magnetic force having a constant magnitude in the same district and accordingly, Bx and By can be determined in the form of Bx=Bx (By) or By=By (Bx) and accordingly, so far as used in the same district, Vx and Vy can be represented as Vx=Vx (Bx) and Vy=Vy (By) without losing generality. When desired, Vx and Vy may be represented in the form of Vx=Vx (By) and Vy=Vy (Bx).

The respective approximate equation is actually a curve and accordingly, when the respective approximate equation is approximated by a polynomial, the respective approximate equation becomes a second or higher degree equation. The inventors have confirmed as exemplified later in the first embodiment, that an approximate equation having sufficient accuracy can be provided by being approximated by a second degree equation. For example, when each of Vx (Bx) and Vy (By) is divided in two areas and approximated by second degree polynomials, a minimum of three points of data may be provided at each area. When two points in the three points are constituted by points of boundaries of an area, the two points can commonly be used in two areas and therefore, with regard to each area, only data of one point at middle may be provided. That is, when each of Vx (Bx) and Vy (By) is divided into two areas and is approximated by second degree equations, with regard to respectives of Vx (Bx) and Vy (By), data of four points may be provided.

According to the first embodiment, for example, when the approximate equation is divided into two areas in each of the X direction and the Y direction, with regard to the X direction, the approximate equation is divided into a range of azimuth angle of 0 degree–90 degree–180 degree and a range of 180 degree–270 degree–360 degree (0 degree) and with regard to the Y direction, the approximate equation is divided into a range of azimuth angle of 90 degree–180 degree–270 degree and a range of 270 degree–360 degree (0 degree)–90 degree. With regard to way of approximation, for example, (1) in respect of Vx (Bx), there are calculated a first X-direction quadratic equation Vx1 (Bx) where the azimuth angle passes through three points of 0 degree, 90 degree and 180 degree and a second X-direction quadratic equation Vx2 (Bx) where the azimuth angle passes through three points of 180 degree, 270 degree and 0 degree (360 degree), with regard to a middle azimuth, the azimuth is approximated by the first or the second X-direction quadratic equation Vxi (Bx) (where i=1, 2) and with regard to Vy (By), there are calculated a first Y-direction quadratic equation Vy1 (By) where the azimuth angle passes through three points of 90 degree, 180 degree and 270 degree and a second Y-direction quadratic equation Vy2 (By) where the azimuth angle passes through three points of 270 degree, 0 degree (360 degree) and 90 degree and with regard to a middle azimuth, the azimuth may be approximated by the first or the second quadratic equation Vyj (By) (where j=1, 2), or (2) quadratic equations may be calculated by the least squares method by using four or more azimuths, that is, measured values of four points or more in the above-described respective ranges, or (3) approximate equations in the respective angular ranges may be calculated by Lagrangean approximation method, that is, Lagrangean interpolation polynomial. When the Lagrangean approximation method is used, (3-a) within the respective ranges, quadratic polynomials may be derived as approximate equations by using three points of both ends and middle or (3-b) polynomials passing through N of desired measured points of four points or more in respective ranges may be derived as approximate equations. In the case of (3-a), the approximate equations coincide with the above-described polynomials of (1). Further, when desired, approximate equations may be approximated by equations other than polynomials.

In this way, according to the first embodiment, for example, with regard to Vy (By), approximate equations are calculated in the form of $Vy1=Ay1 \cdot By^2+Cy1 \cdot By+Dy1$ and $Vy2=Ay2 \cdot By^2+Cy2 \cdot By+Dy2$ (where Ay1, Ay2, Cy1, Cy2, Dy1 and Dy2 are constants) and also with regard to Vx1, Vx2, approximate equations are calculated in the form of $Vx1=Ax1 \cdot Bx^2+Cx1 \cdot Bx+Dx1$ and $Vx2=Ax2 \cdot By^2+Cx2 \cdot By+Dx2$ (where Ax1, Ax2, Cx1, Cx2, Dx1 and Dx2 are constants).

According to the first embodiment, in the case of calculating the approximate equations in the form of (1) or (2), mentioned above, approximate equation storing means is stored with pluralities of such approximate equation Vxi (Bx, By) typically, Vxi (Bx), Vyj (Bx, By), typically, Vyj (By) and notations i and j designate integers of 2 or more. Further, actually, to easily utilize the approximate equations, approximate equation Vxi (Bx) is stored in an inversely converted form of Bx=Bxi (Vx) and approximate equation Vyj (By) is stored in an inversely converted form of By=Byj (Vy). However, also in this case, when desired, from the start, approximate equation may be calculated in the form of By=Byj (Vy).

More generally, the approximate equations between the magnetic field components Bx and By and the magnetic field detected values Vx and Vy stays to be equivalent both in the form of Vxi (Bx, By) and Vyj (Bx, By) and in the form of Bxi (Vx, Vy) and Byj (Vx, Vy) and in this specification, the statement "approximate equations Vxi (Bx, By) and Vyj (Bx, By) calculated based on the magnetic field detected values Vx and Vy of the X-direction and the Y-direction magnetic sensors with regard to a number of azimuths of the azimuth meter in the geomagnetism of the magnetic field components Bx and By, which are the approximate equations Vxi (Bx, By) and Vyj (Bx, By) representing relationships between the detected values Vx and Vy of the magnetic sensor and the magnetic field components Bx and By of the geomagnetism", signifies to include "the approximate equations Bxi (Vx, Vy) and Byj (Vx, Vy) calculated based on the magnetic field detected values Vx and Vy of the X-direction and the Y-direction magnetic sensors with regard to a number of azimuths of the azimuth meter in the geomagnetism of the magnetic field components Bx and By, which are the approximate equations Bxi (Vx, Vy) and Byj (Vx, Vy) representing relationships between the detected values Vx and Vy of the magnetic sensor and the magnetic field components Bx and By of the geomagnetism" except a case particularly mentioned specifically.

In the first embodiment, in the case of using an approximation method such as Lagrangean approximation method, when the approximation equation is calculated in the form of, for example, Bx=Bxi (Vx) from the start, the following relationship is established.

$$Bxi = Bx_k Fvx_k$$

where, for simplifying symbols, with regard to a subscript k, cyclically, a sum of k=m through n is calculated and a lower limit m and an upper limit n of k are determined in accordance with an approximate area i.

In the above equation, the following is established.

$$Fvx_k = \Pi(Vx - Vx_p)/(Vx_k - Vx_p)$$

where with regard to a subscript p, a product of from m to n is cyclically calculated except p=k.

Also with regard to Byj, the following relationship is similarly established.

$$Byj = By_k Fvy_k$$

where with regard to the subscript k, a sum of k=m through n is cyclically calculated and the lower limit m and the upper limit n of k are determined in accordance with an approximate area j. In the above equation, the following is established.

$$Fvy_k = \Pi(Vy - Vy_p)/(Vy_k - Vy_p)$$

where with regard to the subscript p, a product from m to n is cyclically calculated except p=k.

That is, in the first embodiment, when Lagrangean approximation method is used, the approximate equation storing means comprises a storing unit of the general approximate equations and values $(Bx_k, Vx_k)$ and $(By_k, Vy_k)$ which are to be taken in the respective areas. Naturally, in the case of data which are to be used commonly at contiguous ares such as boundary values, a side of selecting the data may be determined and one common data may be stored. For example, in the case of using data with regard to four azimuths of east, west, south and north of the geomagnetism, $(Bx_k, Vx_k)$ and $(By_k, Vy_k)$ with regard to the four azimuths and Lagrangean interpolation polynomials in the X direction and the Y direction and information of the range k may be stored.

Meanwhile, as a result of carrying out further experimental verification and analysis with regard to the Bx–Vx characteristic and the By–Vy characteristic, the inventors have found approximate equations more accurately reflecting influence by the noise magnetic field Bm and capable of accurately carrying out calibration. That is, the inventors have found that an X-direction magnetic field measured value Vx=Vx{φ} and a Y-direction magnetic field measured value Vy=Vy{φ} are provided with two characteristics (1) and (2), mentioned below, by gross classification.

(1) Azimuth angle dependency VxγVx{φ} of the X-direction magnetic field detected value Vx is shifted from cosine curve with regard to the azimuth angle φ in its phase by δx (<0) and the azimuth angle dependency Vy=Vy{φ} of the Y-direction magnetic field detected Vy is shifted from sine curve with regard to the azimuth angle φ in its phase by δy (>0). In other words, Vx=Vx{φ} actually coincides with the cosine curve except that the phase is shifted by δx (<0) and Vy=Vy{φ} actually coincides with the sine curve except that the phase is shifted by δy (>0). It seems that positive or negative (of directions) and magnitudes of the phase shifts δx and δy depend mainly on relative positions of the X-direction and the Y-direction sensors 21 and 22 relative to the battery that is, directions and distances.

(2) When a battery having a different spontaneously magnetized state (magnetism bearing state) is contained, in the case of removing the influence of shift by respectively normalizing (for example, maximum value is +1 and minimum value is −1) Vx=Vx{φ} and Vy=Vy{φ} by which Vx (ordinate)-Bx (abscissa) characteristic and Vy (ordinate)-By (abscissa) characteristic indicate different shifts (deviation) in the ordinate directions Vx and Vy even when the battery is interchanged or a direction (rotational portion) of a button type battery in a circular disk shape is changed, actually, δx and δy do not change significantly but are maintained substantially constant.

By presence of the shifts of the phase angles or the phase difference δx and δy, the azimuth angle φ deviates from the directions of 0°, 90°, 180° and 270° even when directions in which the magnetic field detected values Vx and y take maximum values $Vx_m$ and $Vy_m$ and minimum values $Vx_m$ and $Vy_m$. The directions include errors from the start when initial setting or calibration is carried out by implicitly assuming that "the directions in which the magnetic field detected values Vx and Vy become the maximum values $Vx_m$ and $Vy_m$ and the minimum values $Vx_m$ and $Vy_m$, coincide with directions in which the azimuth angle φ become 0 degree, 90 degree, 180 degree and 270 degree". The errors become significant with regard to the magnetic field detected values at vicinities of azimuths where the geomagnetic components become null such that vicinities of Vy{0}, Vx{90}, Vy{180} and Vx{270} at which dVx/dφ and dVy/dφ become large rather than vicinities of the maximum values and the minimum values of Vx and Vy. Therefore, when the influence of the phase shifts δx and δy is removed, more accurate azimuths can be measured.

In the case of considering the phase differences or the phase shifts δx and δy, the approximate equations are generally given as follows.

$$Bxn = \cos \phi = \cos(\beta x + \delta x) \qquad \text{Equation (1)}$$

$$Byn = \sin \phi = \sin(\beta y + \delta y) \qquad \text{Equation (2)}$$

In the above equations, βx and βy are βx=φ−δx and βy=φ−δy with regard to the azimuth angle φ and Bxn and Byn represent the magnetic field components Bx and By of the geomagnetism in the X and the Y directions in which the amplitude is normalized to 1.

Also Vx and Vy are represented as follows by taking amounts Vxn and Vyn where the amplitudes are normalized to 1.

$$Vxn = \cos(ax) \qquad \text{Equation (7A)}$$

$$Vyn = \cos(ay) \qquad \text{Equation (8A)}$$

magneto-resistive (MR) element is used, so far as a magnetic field of a horizontal magnetic force component of the geomagnetism of about 1 $\mu$T can be detected, in place thereof, a giant magnetic resistive effect (GMR) element or any transducer for converting a magnetic (magnetic field) signal into other physical amount such as an electric signal, an optical signal or other magnetic signal of a magnetized state may be used. As the magneto-resistive element, for example, an element described in U.S. Pat. No. 5,521,501 is preferable. The X-direction magnetic sensor and the Y-direction magnetic sensor typically arranged to be proximate to each other such that for example, substantially an L-like shape is constituted as a whole in consideration of efficient formation of arrangement space, power feed line and signal line. However, depending on cases, the X-direction magnetic sensor and the Y-direction magnetic sensor may be arranged at separate locations. For example, in the case of using a battery having a plane shape of substantially a circular shape or an elliptical shape, the X-direction magnetic sensor and the Y-direction magnetic sensor may separately be arranged along two orthogonal symmetric center lines of the battery.

Further, $\delta$x and $\delta$y are calculated as follows as amounts inherent to the electronic azimuth meter which are not actually dependent upon interchange of the battery in ranges to some degree from measured data with regard to four azimuths.

$$\delta x = \arctan[(Vxn\{90\}-Vxn\{270\})/Vxn\{0\}-Vxn\{180\})] \quad \text{Equation (16)}$$

$$\delta y = \arctan[-Vyn\{0\}-Vyn\{180\})/Vyn\{90\}-Vyn\{270\})] \quad \text{Equation (17)}$$

In this case, when there actually are no offsets in Vx and Vy, $\delta$x and $\delta$y may be calculated from two azimuth data in place of four azimuth data.

Therefore, according to the second embodiment of the invention, azimuth calculating means is constituted such that a large or small relationship between a detected value of one magnetic sensor in the X-direction and the Y-direction magnetic sensors and a first reference value, is compared and based on a result of the comparison, approximate equation in a plurality of approximate equations is selected with regard to other magnetic sensor in the X-direction and the Y-direction magnetic sensors, based on the approximate equation, the magnetic field component in a corresponding direction of the geomagnetism is calculated, a large or small relationship between the magnetic field component or the detected value of the one magnetic sensor and a second reference value, is compared and based on a result of the comparison, the approximate equation in the plurality of approximate equations is selected with regard to the one magnetic sensor. In this case, the approximate equations become plural since when the above-described Equation (7A) and Equation (8A) are represented as equations with regard to $\alpha$x and $\alpha$y in order to provide the relationship between $\beta$x and $\alpha$x and the relationship between $\beta$y and $\alpha$y, many-valued functions are constituted.

However, in the case of the second embodiment, with regard to respectives of the X direction and the Y direction, it is known that the approximate equations can be represented finally by a single cosine function and a single sine function and therefore, way of calculating azimuth may be changed from the above-described procedure.

Further, according to the second embodiment of the invention, approximate equation storing means is provided with a phase difference data storing portion for storing the phase difference data $\delta$x and $\delta$y in the X direction and the Y direction calculated from the magnetic field detected values of the X-direction and the Y-direction magnetic sensors with regard to four azimuths of east, west, south and north of the geomagnetism and the approximate equations in the X direction and the Y direction comprise cosine function and sine function respectively including $\delta$x and $\delta$y.

Further, according to the second embodiment of the invention, approximate equation storing means is provided with a maximum and minimum data storing portion for storing the maximum values $Vx_M$ and $Vy_M$ and the minimum values $Vx_m$ and $Vy_m$ of the magnetic field detected values of the X-direction and the Y-direction magnetic sensors, the approximate equations in the X direction are specified by the maximum value $Vx_M$ and the minimum value $Vx_m$ of the magnetic field detected values of the X-direction magnetic sensor and the phase difference $\delta$x in the X direction and the approximate equation in the Y direction is specified by the maximum value $Vy_M$ and the minimum value $Vy_m$ of the magnetic field detected values of the Y-direction magnetic sensor and the phase difference $\delta$y in the Y direction.

Approximate equation storing means typically comprises a non-volatile memory, for example, EEPROM. When the magnetic part is exposed to a magnetic field sufficiently stronger than the geomagnetism or exposed under a magnetic field in the same direction for a long period of time, the magnetized state or the magnetism bearing state including a magnetic domain state of a ferromagnetic phase area, is changed and therefore, the approximate equations may be subjected to a processing of recalculation as desired, that is, calibration or updating of the azimuth meter may be carried out. Particularly, in the case of interchanging the battery, the magnetic properties of the case can be changed owing to a history of fabricating the case made of stainless steel of the battery and therefore, when interchanging the battery, calibration may be carried out. The calibration may be carried out by the user or a predetermined supply source of the electronic azimuth meter.

In order to enable calibration or updating at least by the user, in the first embodiment, the approximate equation storing means of the electronic azimuth meter is provided with a four azimuth data storing portion for storing the magnetic field detected values of the X-direction and the Y-direction magnetic sensors with regard four azimuths of east, west, south and north of the geomagnetism and the electronic azimuth meter is provided with updating means for updating the magnetic field detected values of the four azimuths of east, west, south and north of the geomagnetism stored to the four azimuth data storing portion and approximate equation calculating means for calculating the approximate equations Vxi (Bx) and Vyj (By) in the X-direction and the Y-direction based on the magnetic field detected values of the four azimuths of east, west, south and north of the geomagnetism stored to the four azimuth data storing portion. At every time of updating the four azimuth data, based on the updated data, the approximate equations are recalculated by the approximate equation calculating means and newly provided approximate equations are stored to the approximate equation storing means.

Meanwhile, in the case of the second embodiment, in order to enable to carry out calibration or updating at least by the user, there may be provided updating means for updating maximum values and minimum values of the X-direction and the Y-direction magnetic field detected values stored to the maximum and the minimum data storing portion.

When the electronic azimuth meter is brought into the horizontal state and is directed to a desired azimuth at a desired location, by the horizontal magnetic forces Bx and By of the geomagnetism in accordance with the azimuth, respectives of the X-direction and the Y-direction magnetic sensors provide outputs Vx and Vy in accordance with the magnetic field formed at the magnetic sensors.

Based on the outputs Vx and Vy, the azimuth calculating means determines one approximate equation to be used from the pluralities of approximate equations Vxi and Vyj for each of the X-direction and the Y-direction magnetic sensors.

Further particularly, in the case of the first embodiment, according to the azimuth calculating means, for example, a large or small relationship between a detected value (for example, Vx) of one (for example, X-direction) magnetic sensor in the X-direction and the Y-direction magnetic sensors and the first reference value, is compared, based on a result of the comparison, one approximate equation in the plurality of approximate equations is selected with regard to other (for example, Y-direction) magnetic sensor of the X-direction and the Y-direction magnetic sensors, based on the approximate equation, the magnetic component (for example, By) in a corresponding direction of the geomagnetism is calculated, a large or small relationship between the magnetic field component and the second reference value is compared and based on a result of the comparison, one approximate equation in the plurality of equations is selected with regard to the one magnetic sensor.

That is, for example, when the approximate equations are two of respectives of Vx1 and Vx2 and Vy1 and Vy2 as mentioned above and as four points, four points of 0 degree, 90 degree, 180 degree and 270 degree are adopted for the azimuth angle $\phi$, by using values of Vx (Bx−max) and Vx (Bx−min) in the case of the azimuth angles of $\phi$ of 0 degree and 180 degree (in the following, with the azimuth angle as a variable in place of the magnetic field, these are also represented as Vx{0} and Vx{180}), {Vx(Bx−max)+Vx (Bx−min)}/2 constitutes the first reference value, the first reference value is compared with Vx, when Vx is larger, the azimuth angle $\phi$ is to be disposed in a range of −90 degree (270 degree)–0 degree (360 degree)–90 degree and therefore, with regard to Vyj (By), there is selected the approximate equation Vy1 (By) covering the range from −90 degree (270 degree) to 90 degree, conversely, when Vx is smaller, the azimuth angle $\phi$ is to be disposed in the range of 90 degree–180 degree–270 degree and accordingly, with regard to Vyj (By), there is selected the approximate equation Vy2 (By) covering the range of 90 degree through 270 degree. Further, in the case in which by influence of shape or arrangement of the magnetic part and the vertical direction component of the geomagnetism, the azimuth of the electronic azimuth meter is inverted, when way of change of the magnetic field in accordance with change of the azimuth angle significantly differs, the first reference value may be determined in consideration of the characteristic.

Next, from the selected approximate equation Vy1 (By) or Vy2 (By) (more in details, typically, approximate equation in an inversely-converted form) and the measured value Vy, the magnetic field component By of the horizontal magnetic force of the geomagnetism is calculated, zero is adopted as the second reference value, and when the magnetic field component By is positive, azimuth angle $\phi$ is to be disposed in the range of 0 degree–90 degree–180 degree and accordingly, with regard to Vxi (Bx), there is selected the approximate equation Vx1 (Bx) covering the range of 0 degree through 180 degree and when the magnetic field component By is negative, the azimuth angle $\phi$ is to be disposed in the range of 180 degree–270 degree–360 degree (0 degree) and accordingly, with regard to Vxi (Bx), there is selected the approximate equation Vx2 (Bx) covering the range of 180 degree through 360 degree. Further, based on the selected approximate equation (more in details, typically, approximate equation in the inversely-converted form), the magnetic field component Bx of the horizontal magnetic force of the geomagnetism is calculated.

Meanwhile, in the case of the second embodiment, as mentioned above, the azimuth calculating means is constituted such that the large or small relationship between the detected value of one magnetic sensor of the X-direction and the Y-direction magnetic sensors and the first reference value is compared and based on the result of comparison, with regard to other magnetic sensor of the X-direction and the Y-direction magnetic sensors, one approximate equation of the plurality of approximate equations is selected, the magnetic field component in the corresponding direction of the geomagnetism is calculated based on the approximate equation, the large or small relationship between the magnetic field component or the detected value of the one magnetic sensor and the second reference value is compared and based on a result of the comparison, with regard to the one magnetic sensor, one approximate equation of the plurality of approximate equations is selected.

Azimuth angle $\phi$ is calculated in the form of arctan (By/Bx) from the magnetic field components Bx and By calculated in this way and the azimuth is calculated. Further, arctan is also typically calculated by using a polynomial having fast convergence as approximate equation.

That is, based on the detected values Vx and Vy of the X-direction and the Y-direction magnetic sensors, the azimuth calculating means calculates the X-direction and the Y-direction components Bx and By of the horizontal magnetic force of the geomagnetism and calculates the azimuth of the azimuth meter.

The electronic azimuth meter main body is basically of any shape and typically, a plane shape thereof is substantially a rectangular shape or a rectangular shape in a square shape, substantially a circular shape or substantially an elliptical shape. Naturally, strictly speaking, there are many cases in which the plane shape is a further complicated shape. Further, in this specification, a substantially rectangular shape signifies to include a polygonal shape in which with a substantially rectangular shape or a substantially square shape as basis, at least a portion of a side is constituted by a plurality of sides. Further, a number of the magnetic parts, positions and shapes thereof may basically of any of them.

In order to make the electronic azimuth meter main body as compact as possible and operable for a long period of time, according to the electronic azimuth meter main body, typically, the plane shape is substantially a rectangular shape, that is, a shape substantially near to a square shape or a rectangular shape, there is arranged a battery in a circular disk shape or a circular plate shape which is large to a degree of equal to be inscribed substantially to a rectangular shape in consideration of arrangement of other parts at a central portion of the electronic azimuth meter main body and the magnetic sensors are arranged at a location where a gap is produced between a rectangular shape and a circle inscribed to the rectangular shape by an extreme expression, that is, a corner of the rectangular shape. Further, an existing small-sized thin type battery is provided with a plane shape substantially in a circular shape and accordingly, in order to minimize the size of the main body, the plane shape of the electronic azimuth meter main body is constituted by substantially a rectangular shape, however, when the plane shape of the thin type battery is provided with a shape other than the circular shape, the plane shape of the electronic azimuth meter main body can be changed in accordance therewith.

When the electronic azimuth meter main body, more in details, the case is substantially rectangular, typically, the magnetic field directions X and Y detected by the above-described X-direction and Y-direction magnetic sensors are selected to coincide with directions of extending two sides of the rectangular shape. Further, when desired, the directions of extending two sides of the rectangular shape may differ from the X and the Y direction. For example, in view of an X-Y plane, a direction along a line connecting a position in correspondence with the center of the circular battery and the magnetic sensor may constitute the X direction or the Y direction.

Although as the magnetic sensor, for example, a magneto-resistive (MR) element is used, so far as a magnetic field of a horizontal magnetic force component of the geomagnetism of about 1 ?T can be detected, in place thereof, a gigantic magnetic resistive effect (GMR) element or any transducer for converting a magnetic (magnetic field) signal into other physical amount such as an electric signal, an optical signal or other magnetic signal of a magnetized state may be used. As the magneto-resistive element, for example, an element described in U.S. Pat. No. 5,521,501 is preferable. The X-direction magnetic sensor and the Y-direction magnetic sensor are typically arranged to be proximate to each other such that for example, substantially an L-like shape is constituted as a whole in consideration of efficient formation of arrangement space, power feed line and signal line. However, depending on cases, the X-direction magnetic sensor and the Y-direction magnetic sensor may be arranged at separate locations. For example, in the case of using a battery having a plane shape of substantially a circular shape or an elliptical shape, the X-direction magnetic sensor and the Y-direction magnetic sensor may separately be arranged along two orthogonal symmetric center lines of the battery.

The above-described electronic azimuth meter can adopt a mode of an electronic time piece having an electronic azimuth meter (or electronic azimuth meter having electronic timepiece) in which there are selected a mode of operating as an azimuth meter by a mode selecting switch such as a push button switch and a mode operating as a time piece by being assembled to a case integrally with an electronic time piece such as a wrist watch.

BRIEF DESICRIPTION OF THE DRAWINGS

A preferred form of the present invention is illustrated in the accompanying drawings in which.

Figure 1:
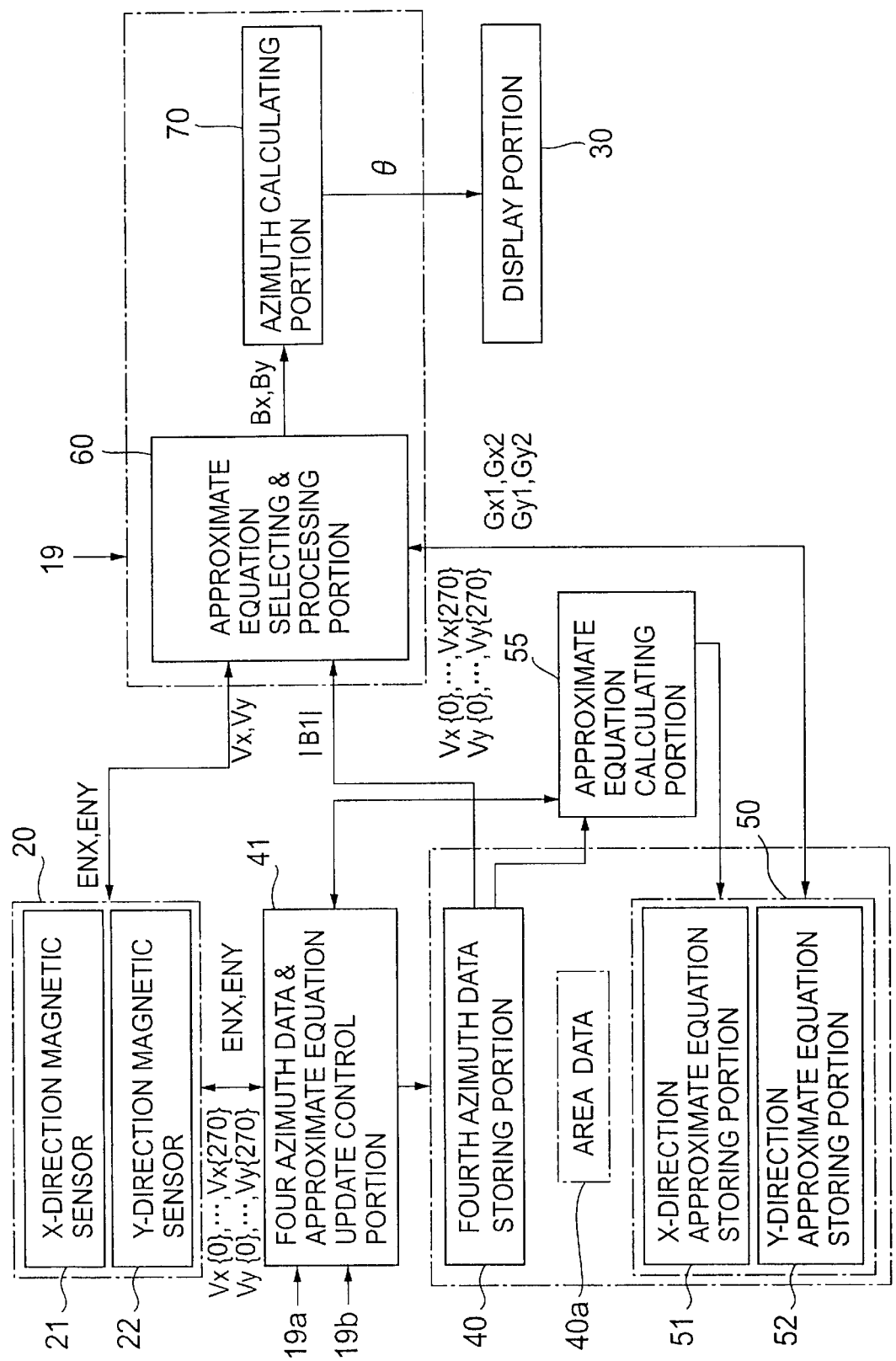
FIG. 1 is a functional block diagram showing an electronic azimuth meter according to a preferable embodiment of the invention.
Figure 10:
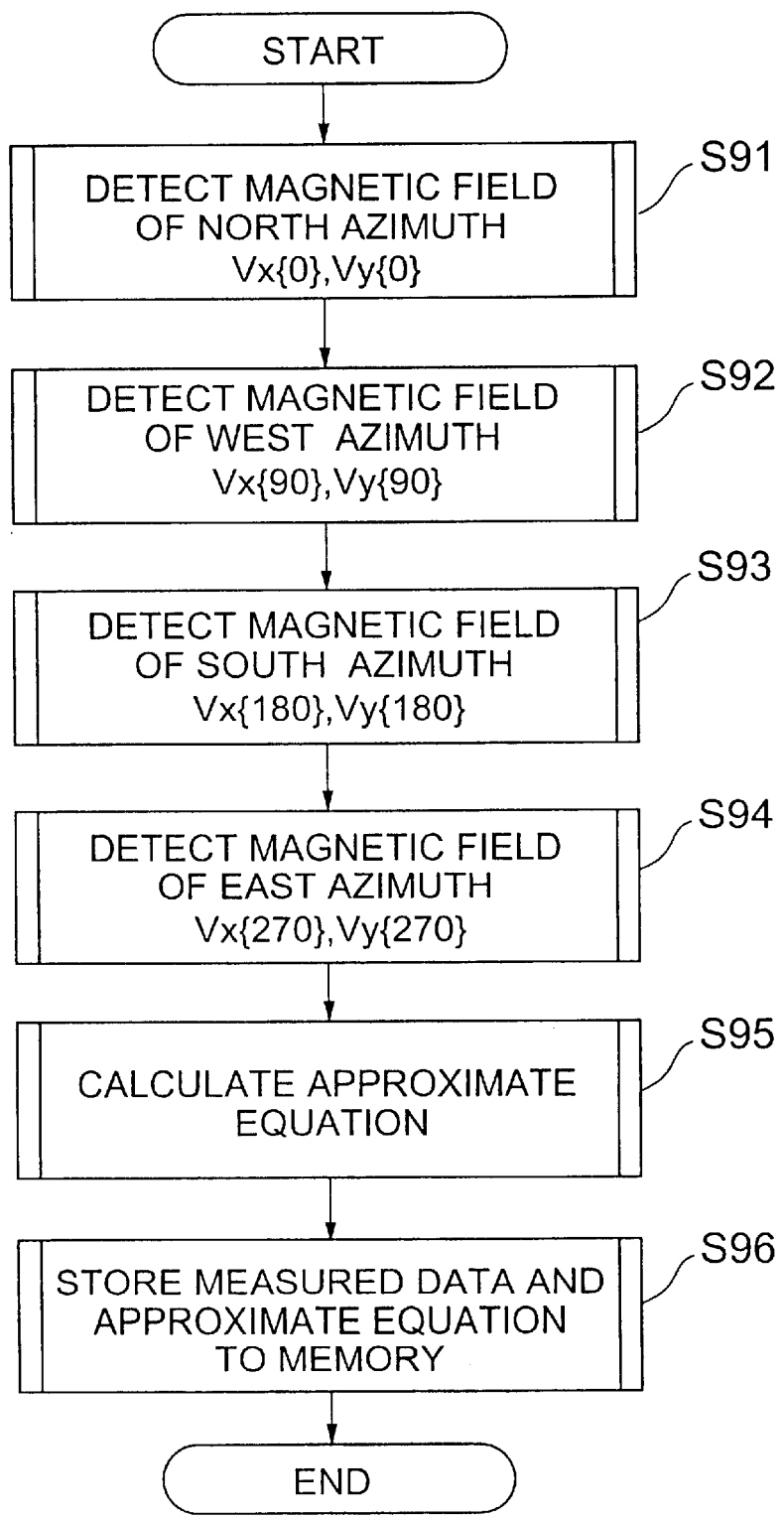
FIG. 10 is a flowchart of calibration for explaining way of measuring the azimuth of the electronic azimuth meter of FIG. 1.
Figure 11:
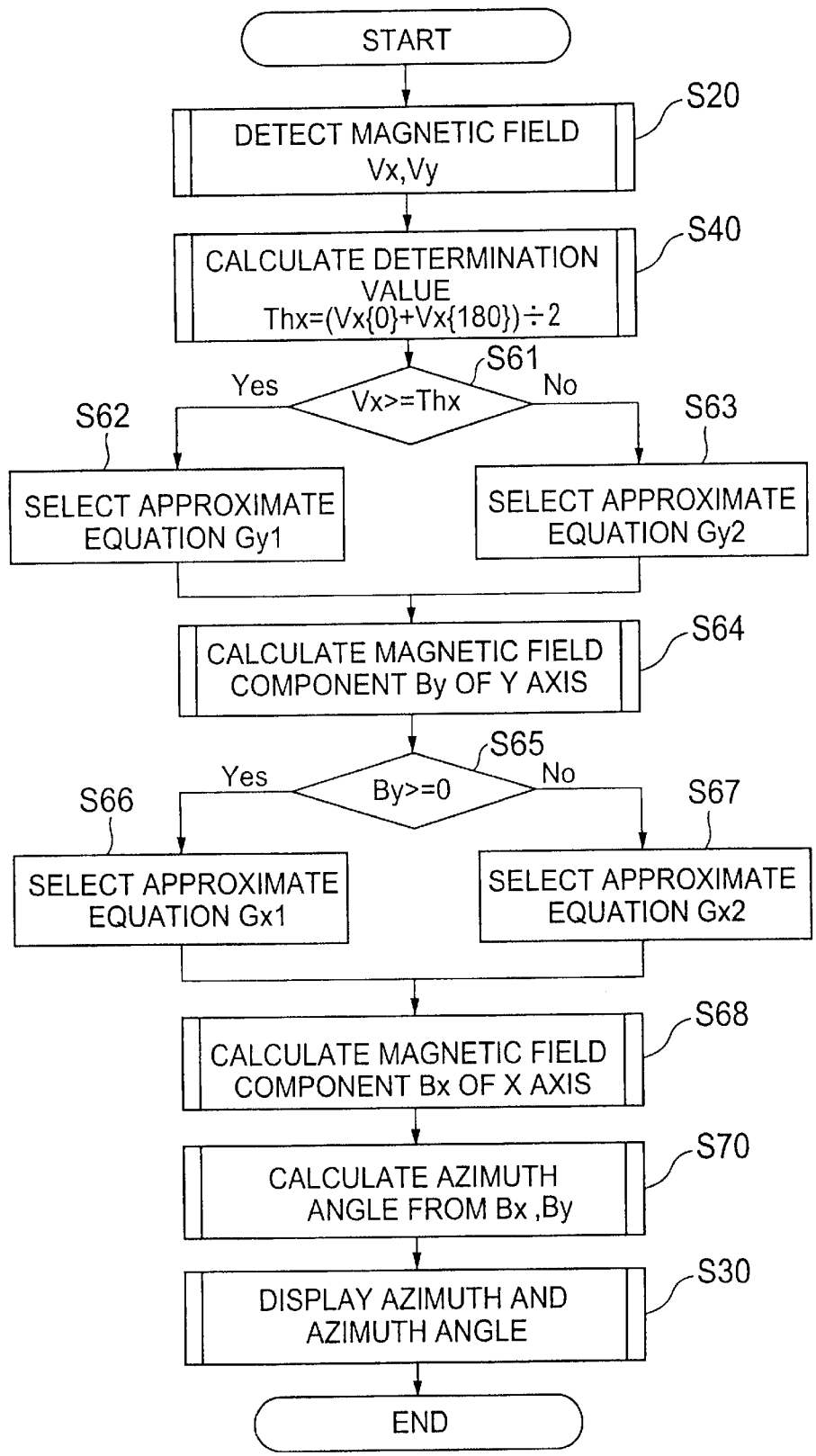
FIG. 11 is a flowchart of a total of an azimuth calculation processing for explaining the way of measuring the azimuth of the electronic azimuth meter of FIG. 1.
Figure 14:
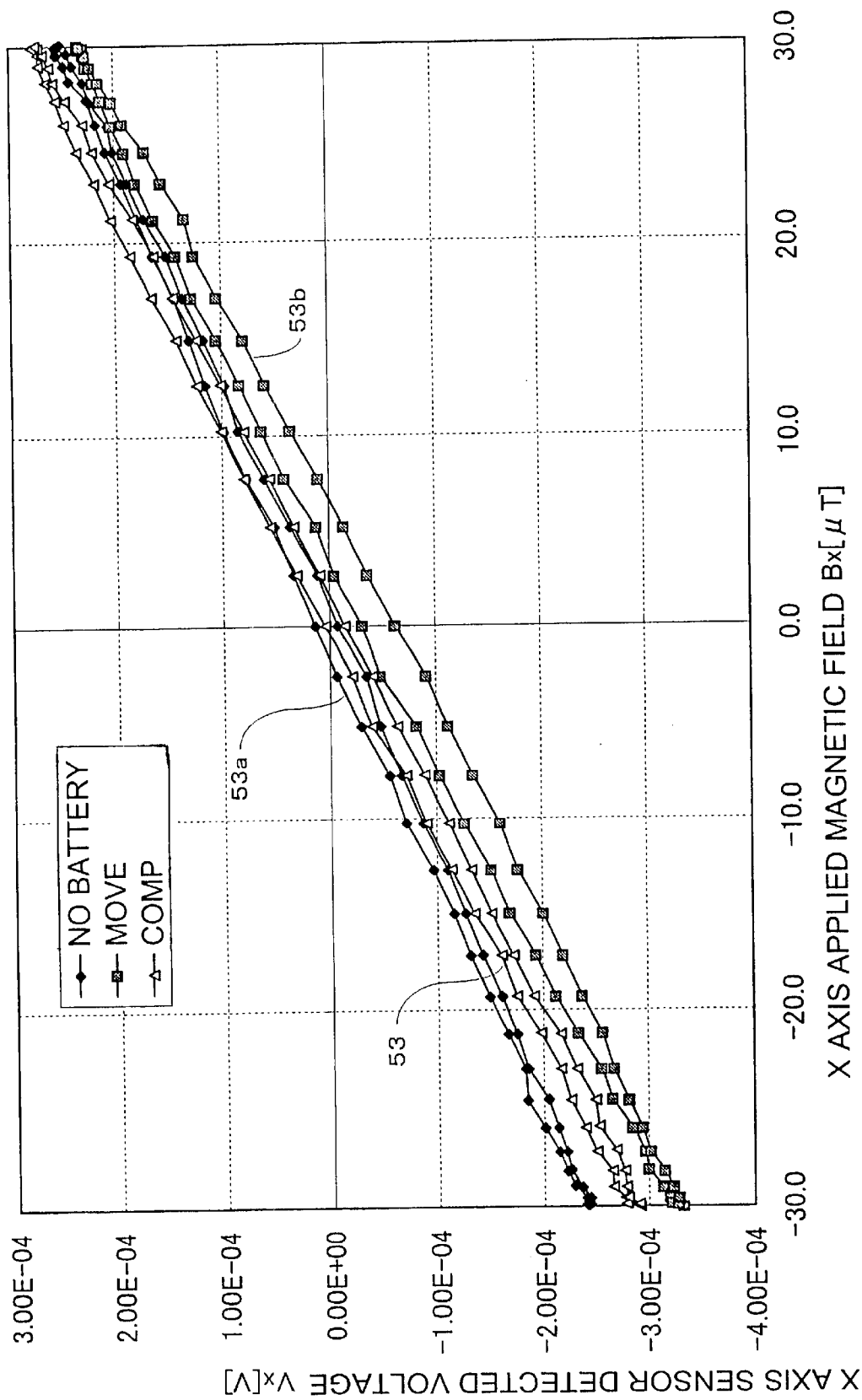
Figure 15:
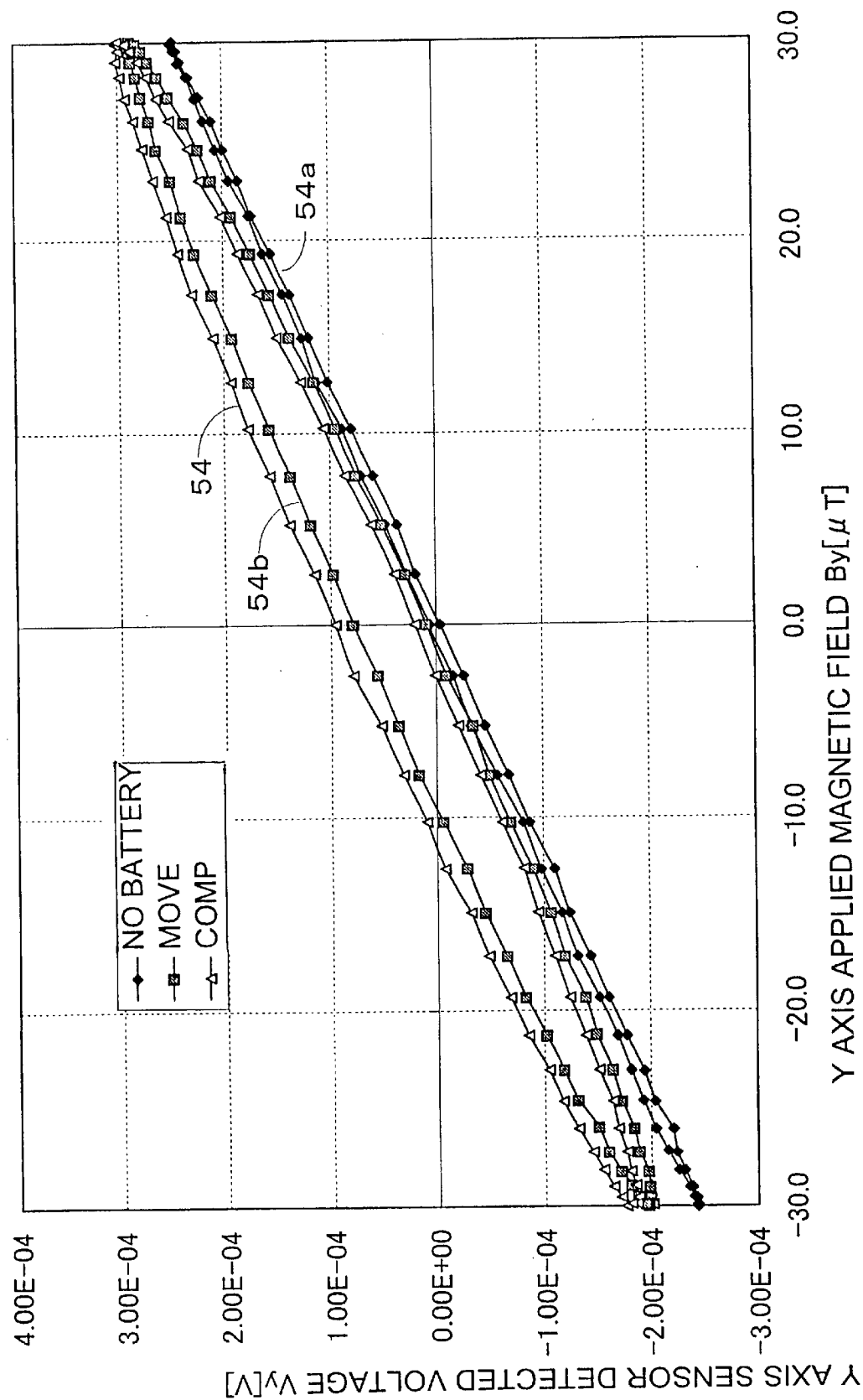
Figure 16:
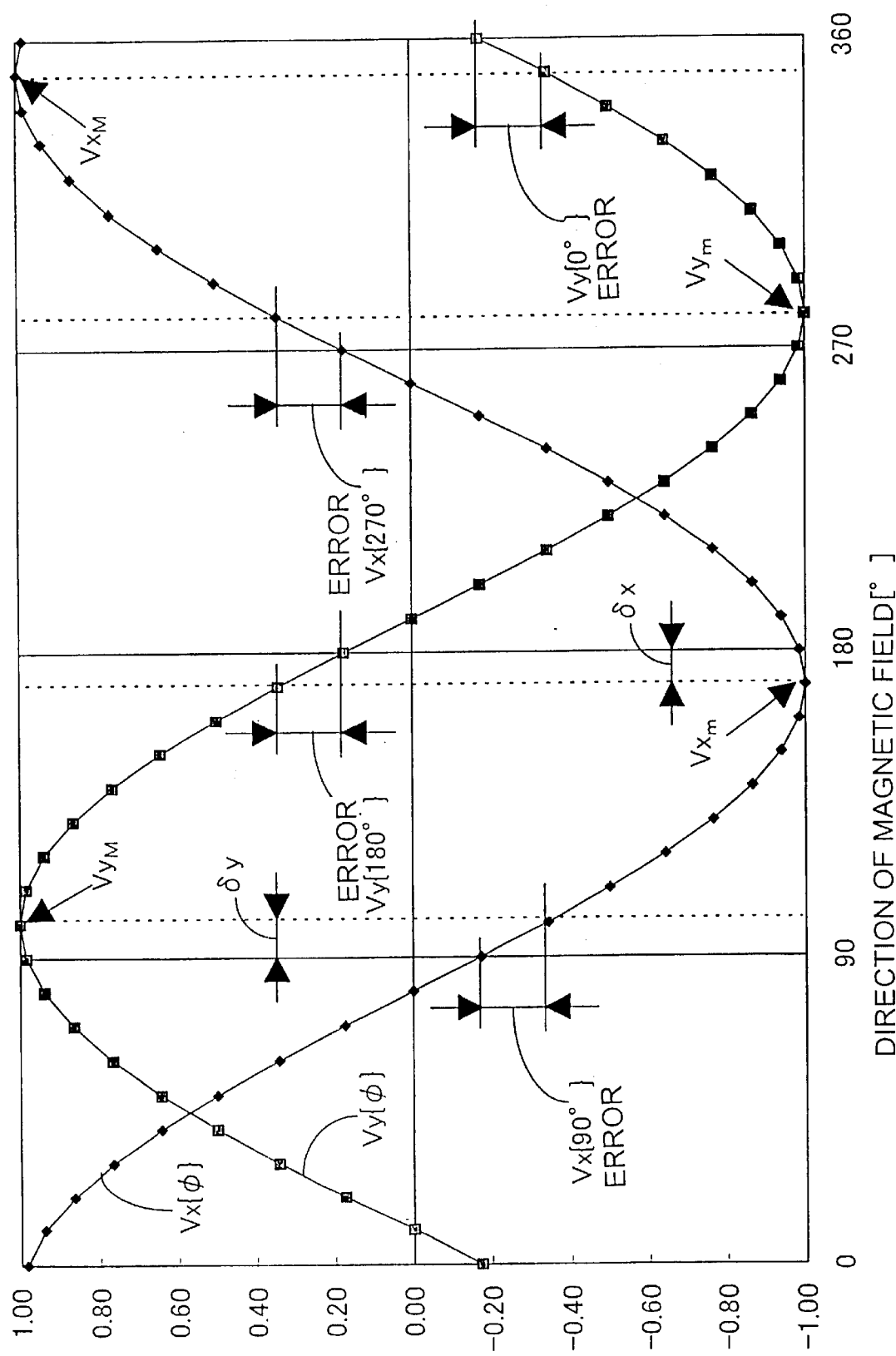
Figure 17:
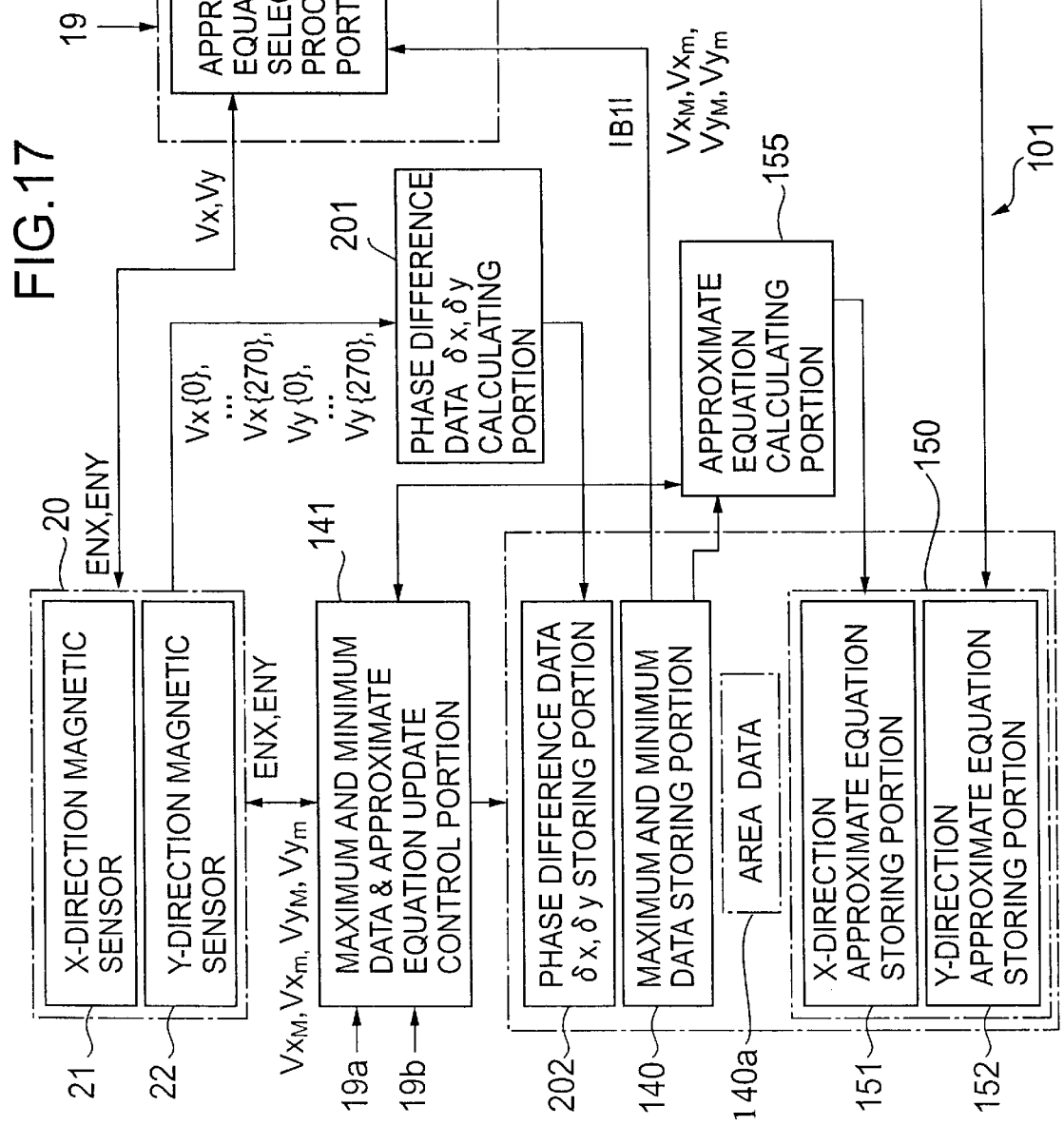
Figure 18:
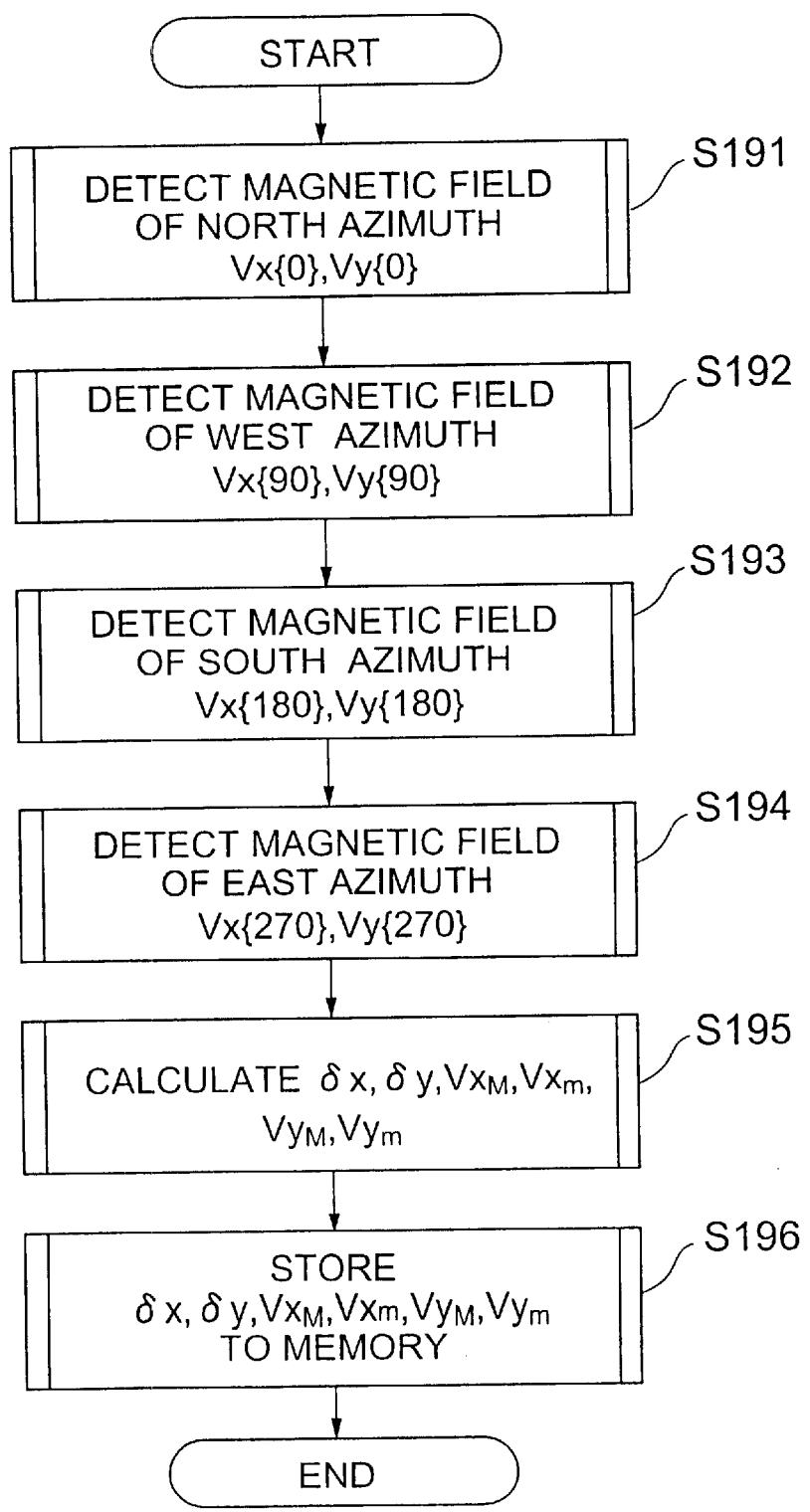
Figure 19:
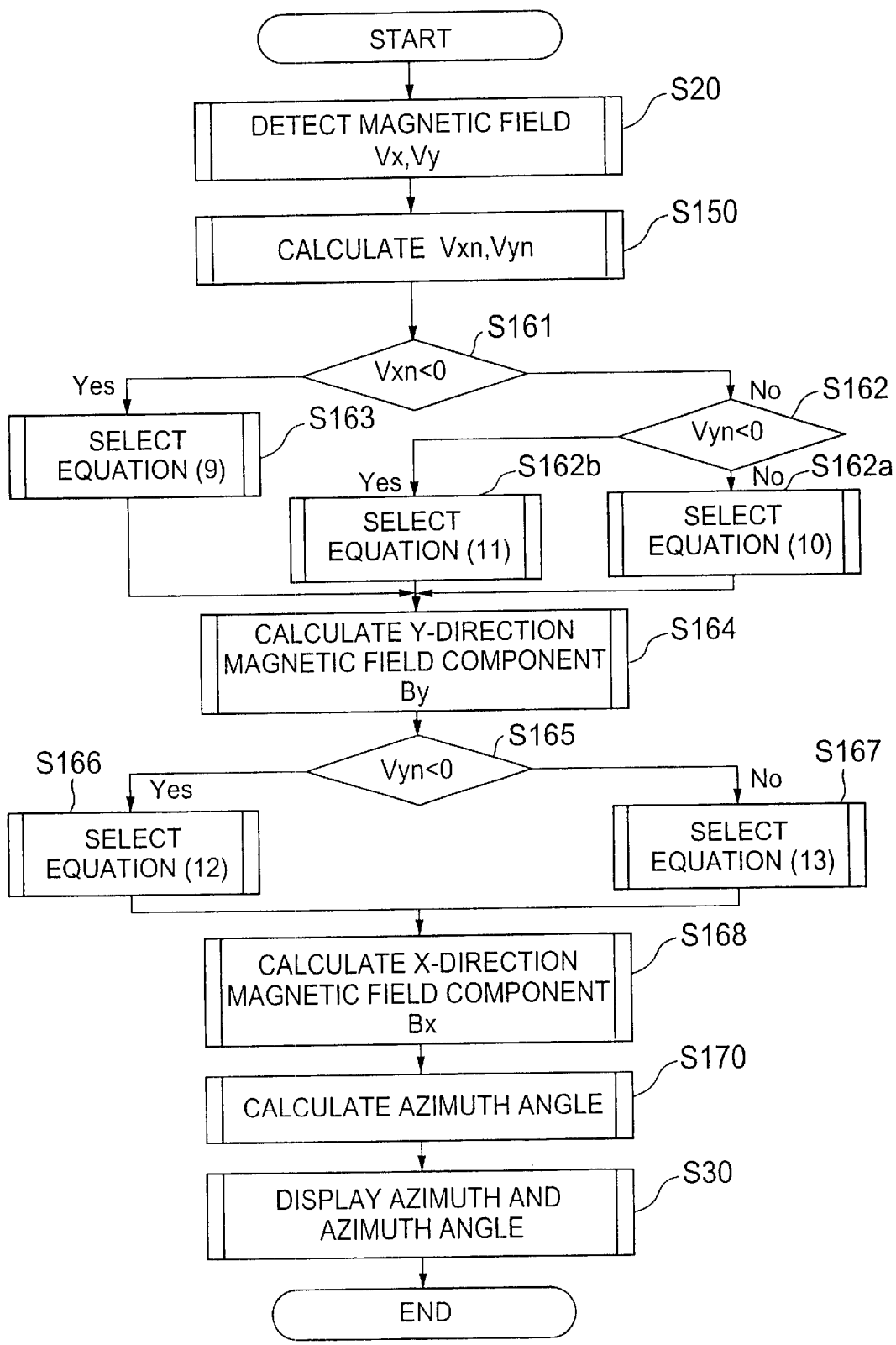
Figure 20:
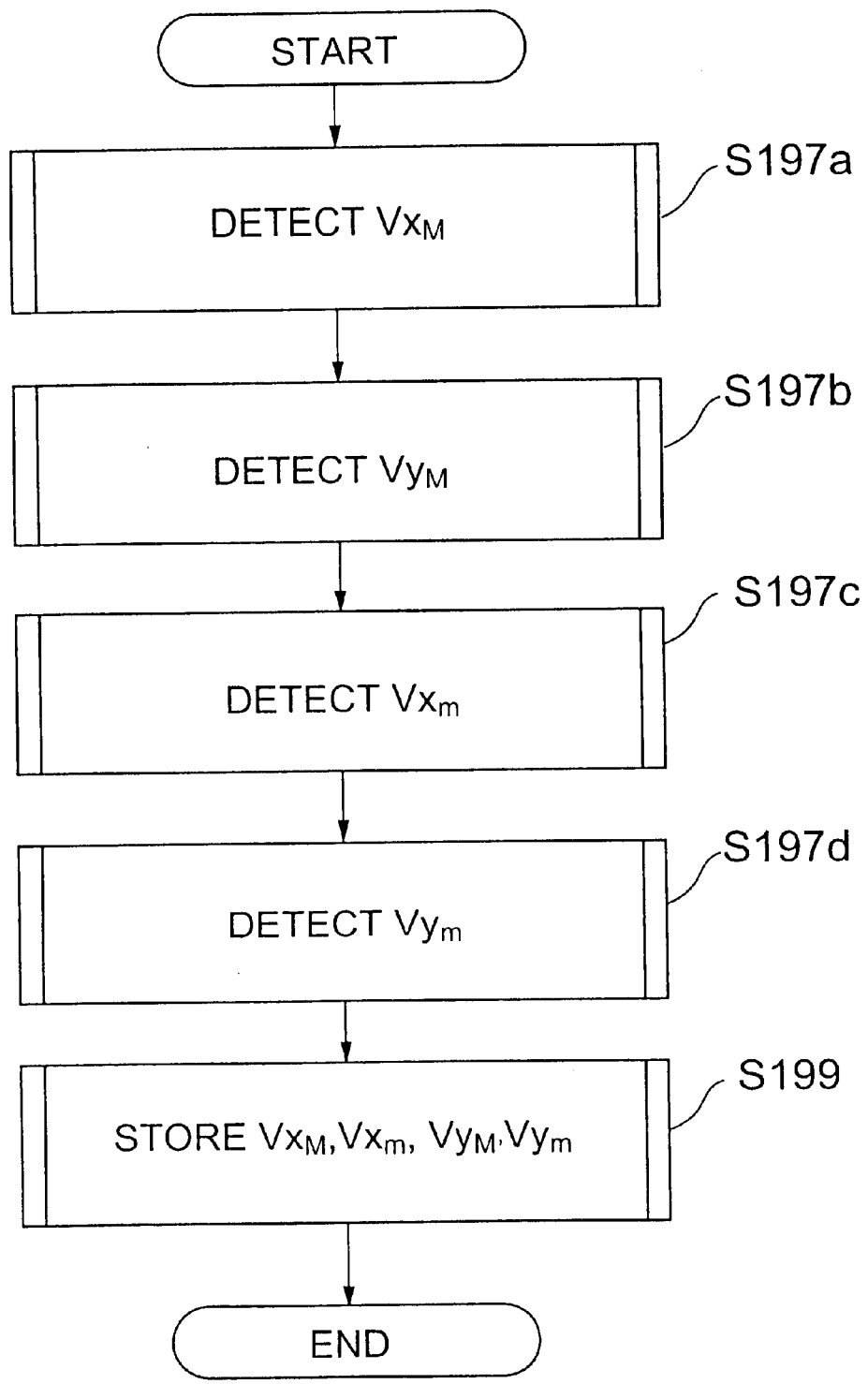

FIG. 14 is a graph showing the relationship between the X-direction component Bx of the geomagnetism and the output Vx of the X-direction magnetic sensor with regard to the electronic azimuth meter of FIG. 1 in the case in which a finished product, a case back and an exterior part are not present and in the case in which other than a circuit board mounted with magnetic sensors are not present (battery, case back and the like are not present) (where with regard to vertical axis, "E" designates numerical value "10");

FIG. 15 is a graph showing the relationship between the Y-direction component By of geomagnetism and the output Vy of the Y-direction magnetic sensor with regard to the electronic azimuth meter of FIG. 1 in the case in which a finished product, a case back and an exterior part are not present and in the case in which other than a circuit board mounted with the magnetic sensors are not present (battery, case back and the like are not present) (wherewith regard to vertical axis, "E" designates numerical value "10");

FIG. 16 is a graph showing a relationship between azimuth of an electronic azimuth meter and a magnetic sensor output (magnetic field detected value) which has been found newly by the inventors as a basis of an electronic azimuth meter of a preferable second embodiment according to the invention;

FIG. 17 is a functional block diagram with regard to the electronic azimuth meter of the preferable second embodiment according to the invention and is a block diagram in correspondence with FIG. 1 of the first embodiment;

FIG. 18 is a flowchart in initial setting with regard to the electronic azimuth meter of the preferable second embodiment according to the invention in correspondence with FIG. 10 of the first embodiment with regard to the initial setting;

FIG. 19 is a flowchart showing a procedure of azimuth measurement using the electronic azimuth meter of the preferable second embodiment according to the invention in correspondence with FIG. 11 of the first embodiment; and FIG. 20 is a flowchart in calibration with regard to the electronic azimuth meter of the preferable second embodiment according to the invention in correspondence with FIG. 10 of the first embodiment with regard to the calibration.

DETAILED DESCRIPTION OF THE PREFERRED EMBODIMENTS

Next, an explanation will be given of preferable embodiments according to the invention based on preferable embodiments shown in attached drawings.

First, an explanation will be given of a first embodiment with regard to the first embodiment shown in FIG. 1 through FIG. 15.

Figure 2:
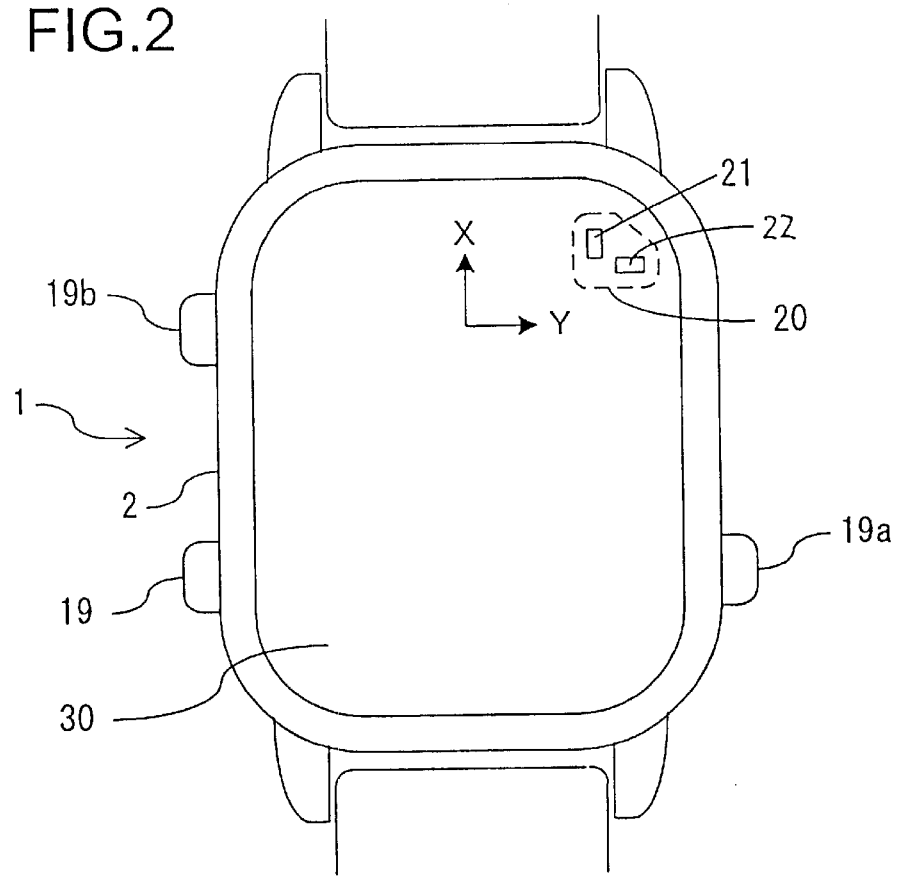
FIG. 2 is an explanatory plane view of an outlook showing the electronic azimuth meter according to the preferable embodiment of the invention.
Figure 3:
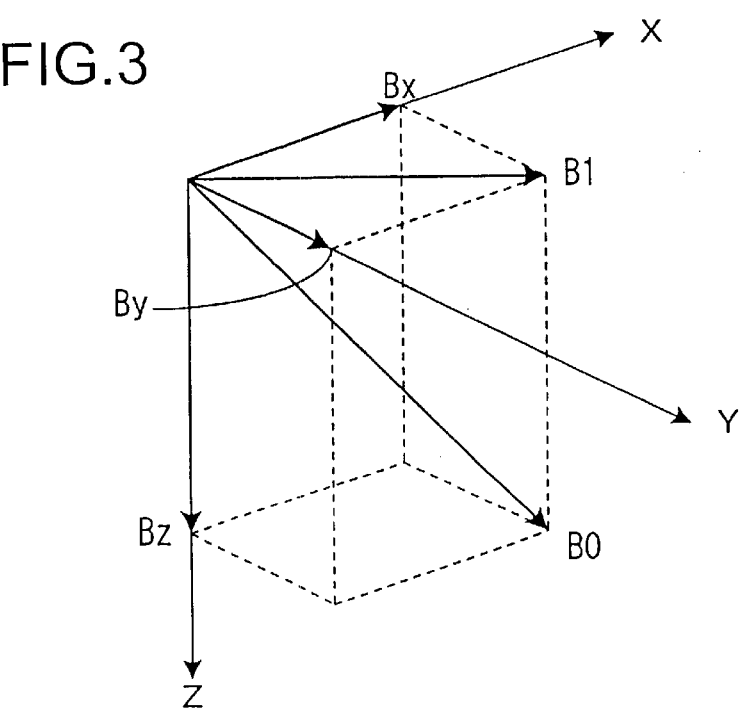
FIG. 3 is a graph for explaining geomagnetism showing the electronic azimuth meter according to the preferable embodiment of the invention.

As shown by FIG. 2, an electronic azimuth meter 1 is integrated to, for example, a wrist watch and takes a mode of an electronic time piece having an electronic azimuth meter or an electronic azimuth meter having an electronic time piece. The electronic azimuth meter 1 is provided with magnetic sensors in FIG. 2 indicated by a broken line 20. A magnetic sensor 20 is provided with an X-direction magnetic sensor 21 and a Y-direction magnetic sensor 22 for detecting magnetic fields in two axes of X and Y directions of an orthogonal coordinate system fixed to an azimuth meter main body 2 (for example, FIG. 1). The X direction is in parallel with a longitudinal direction of the main body 2 substantially in a rectangular shape and the Y direction is in parallel with a bottom side of the main body 2. An X-Y plane specified by the two axes of X and Y constitutes a horizontal face when a display portion 30 of the azimuth meter main body 2 is made horizontal typically. Therefore, as shown by FIG. 3, when the X-Y plane is made horizontal, the geomagnetism (magnetic field thereof) represented by a vector B0 is provided with horizontal magnetic force represented by a vector B1 in the horizontal face and is provided with a magnetic field component designated by Bz directed downwardly in the vertical direction in accordance with dip of about 50 degree in the case of Tokyo. Further, an X direction and a Y direction component in the horizontal face of the geomagnetism B0 exerting the horizontal magnetic force B1, are respectively designated by notations Bx and By. Therefore, when noise (magnetic field) other than the geomagnetism B0 is not applied at locations of the X-direction and Y-direction magnetic sensors 21 and 22, the X-direction and the Y-direction magnetic sensors 21 and 22 respectively detect the magnetic fields Bx and By and provide outputs in accordance therewith.

Each of the X-direction and the Y-direction magnetic sensors 21 and 22 is preferably as described in U.S. Pat. No. 5,521,501 and as shown schematically by FIG. 9, for example, there are formed bridge circuits each including four magneto-resistive elements (MR elements) 21a, 21b, 21c and 21d or 22a, 22b, 22c and 22d, in a form of a difference of the bridge circuits, there are provided magnetic field detected and outputted values Vx and Vy of the sensors 21 and 22. Further, the MR elements are applied with predetermined bias magnetic fields such that the detected values Vx and Vy constitute linear outputs. Further, the respective magnetic sensors 21 and 22 each comprises, for example, a thin film extended in zigzag as in tracing combteeth, the magnetic sensor 21 in the X direction is constituted to be extended in the X direction as a whole while repeating zigzag in the Y direction to detect the X direction magnetic field and the magnetic sensor 22 in the Y direction is constituted to extend in the Y direction as a whole while repeating zigzag in the X direction to detect the Y-direction magnetic field. As the X-direction and the Y-direction magnetic sensors 21 and 22, the MR elements may be used in a mode different from the illustrated bridge circuits or other magnetic field detecting means of GMR elements or the like may be used in place of the MR elements so far as weak magnetic field of about 1 $\mu$T can be detected. However, the azimuth is calculated by comparing a detected value of the X-direction magnetic field with a detected value of the Y-direction magnetic field and therefore, it is preferable to use elements having characteristics as similar as possible for the X-direction and the Y-direction magnetic sensors 21 and 22, further, when each of the magnetic sensors 21 and 22 is formed by a plurality of detecting portions such as the four MR elements, it is preferable to minimize spacial distances among the plurality of detecting portions to thereby minimize influence by nonuniform magnetic field. Further, in order to make compact circuit systems of power feed lines, control signal lines or signal lines accompanied by the magnetic sensors 21 and 22 by arranging the systems efficiently, it is preferable to arrange the systems in a state as proximate as possible so far as mutual interference is not caused. However, the X-direction sensor 21 and the Y-direction sensor 22 may be arranged to separate from each other.

According to the azimuth meter main body 2, in view of the structure, it is difficult to avoid that magnetic field Bm (Bmx, Bmy) constituting noise is more or less generated at the locations of the magnetic sensors 21 and 22 by being magnetized by the geomagnetism B0. Particularly, when the azimuth meter main body 2 is made compact, the magnetic sensors 21 and 22 are arranged to be proximate to magnetic parts and therefore, it is difficult to disregard that the noise magnetic field Bm which is not uniform spacially is generated at the locations of the magnetic sensors 21 and 22.

Figure 4:
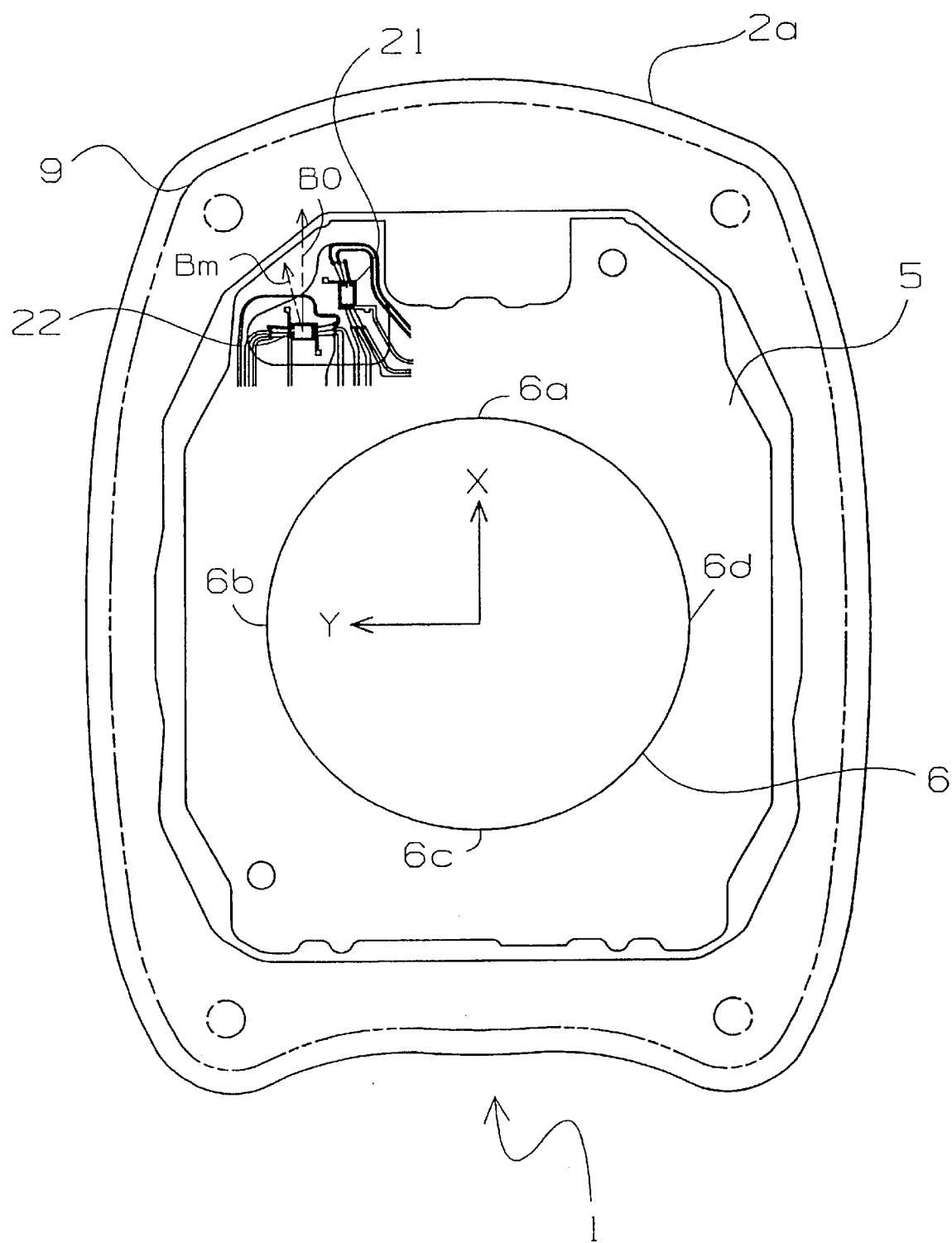
FIG. 4 is an explanatory bottom view viewing the electronic azimuth meter of FIG. 2 from a rear face in a state of removing a back case.
Figure 5:
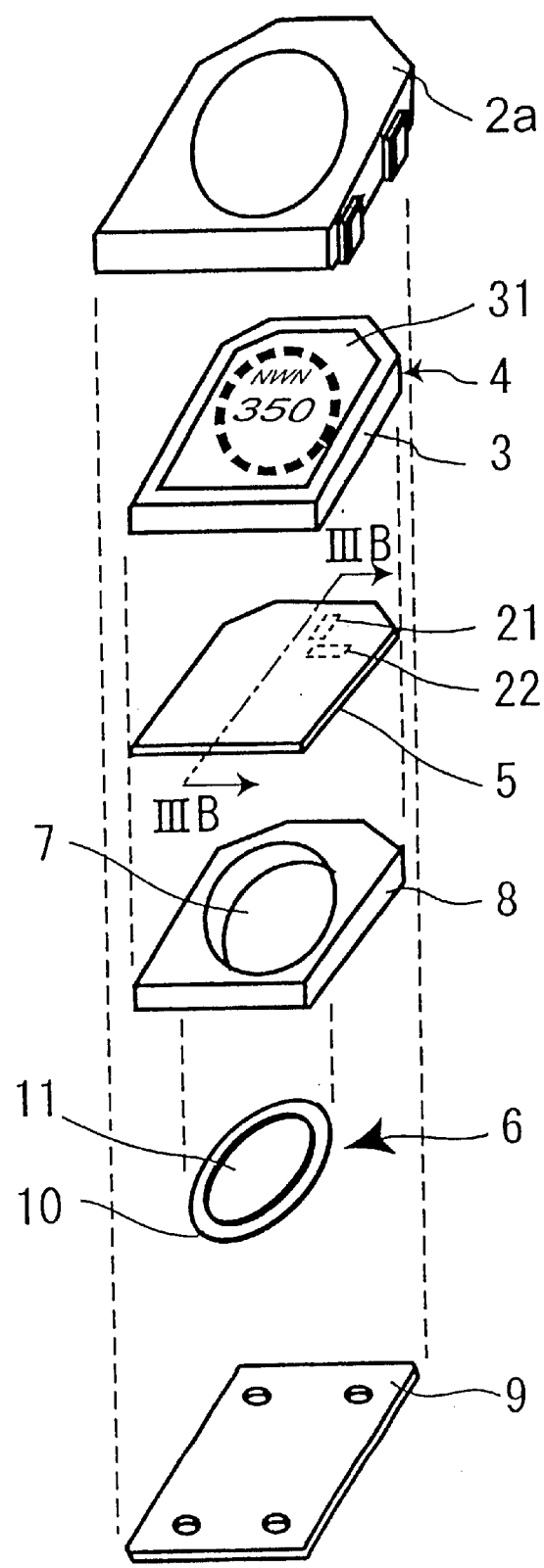
FIG. 5 is a disassembled perspective view for explaining constitution of parts of the electronic azimuth meter of FIG. 1.

As shown by a disassembled view in FIG. 5, the azimuth meter main body 2 is provided with an upper portion 4 integrated with an exterior case 2a and a liquid crystal panel portion 31 forming the display portion 30 at an upper case 3 made of plastic substantially in a rectangular shape, a circuit board 5 attached to a lower face of the upper portion 4 which is the circuit board 5 mounted with circuit parts of a microprocessor chip, a memory (RAM or programmble PROM or the like), resistors and so on and mounted with the magnetic sensor 20 including the X-direction and the Y-direction magnetic sensors 21 and 22 at its lower face, a lower case 8 made of plastic substantially in a rectangular shape which is provided with a large opening 7 for containing a battery 6 at its central portion and attached to the lower face of the circuit board 5, the battery 6 and a case back 9 made of stainless steel such as SUS 304. FIG. 4 is a plane view viewing from a back face side in a state removed of the case back 9 indicated by an imaginary line and as is apparent from the drawing, the X-direction and the Y-direction magnetic sensors 21 and 22 are disposed at a location proximate to the battery 6 in a circular plane shape at a corner of the case substantially in the rectangular shape. Further particularly, the Y-direction magnetic sensor 22 is disposed at a location comparatively proximate to an X-direction end edge 6a of the battery 6 (for example, within 2 cm of distance from edge of battery) and the X-direction magnetic sensor 21 is disposed at a location comparatively remote from a Y-direction end edge 6b of the battery 6 (although proximate thereto) (within 2 cm of distance from edge of battery). Further, according to the embodiment, the Y-direction magnetic sensor 22 is remote from a –X-direction end edge 6c of the battery 6 in view of an X-Y coordinate system with the center of the battery as its original point (about 1.4 cm, about 0.8 cm) and the X-direction magnetic sensor 21 is remote from a −Y-direction end edge 6d of the battery 6 in view of the similar coordinate system (about 1.6 cm, about 0.6 cm). The radius of the battery is about 1 cm. Further, although arrangement of the X-direction and the Y-direction magnetic sensors 21 and 22 may be reversed, the proximity situation remains substantially the same.

In the group of parts shown by FIG. 5, for example, mainly, the battery 6 is easy to magnetize or to be provided with magnetism under the geomagnetism B0 and for example, a magnetic part is constituted by the battery 6. When an Li battery or the like having a large current capacitance is arranged to occupy a maximum volume as the battery 6, it is difficult to disregard influence of the noise magnetic field Bm which is formed at the location of the magnetic sensor 20 by magnetizing the battery 6 under the geomagnetism B0 and which is not uniform.

Figure 7:
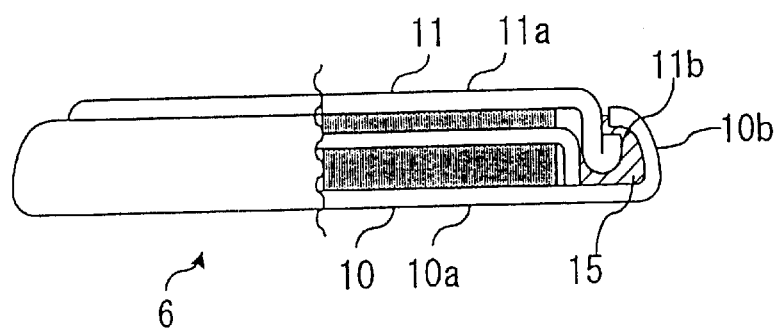
FIG. 7 is an explanatory partially cut side view of a battery for explaining the constitution of the parts of the electronic azimuth meter of FIG. 1.

According to the battery 6, for example, as shown by partially cutting the battery 6 in FIG. 7, a positive pole and a negative pole terminal 10 and 11 is made of stainless steel such as SUS 304 and is provided with substantially a tray-like shape and includes a positive pole material, a negative pole material, an electrolyte holding portion between there and a separator at inside thereof. Numeral 15 designates a gasket. Although austenite series stainless steel such as SUS 304 is typically nonmagnetic, it seems that the martensitic phase is partially formed by cold forming or the like, comparatively weak ferromagnetic property is provided, as a matter of fact, the steel is magnetized to a degree which cannot be disregarded under the geomagnetism B0 and the noise magnetic field Bm (Bmx, Bmy) is formed at the locations of the magnetic sensors 21 and 22. Further, the positive pole and the negative pole terminals 10 and 11 are respectively provided with contact forming terminal portions 10a and 11a in a circular plate shape and peripheral edge rise portions 10b and 11b calked to each other.

Figure 6:
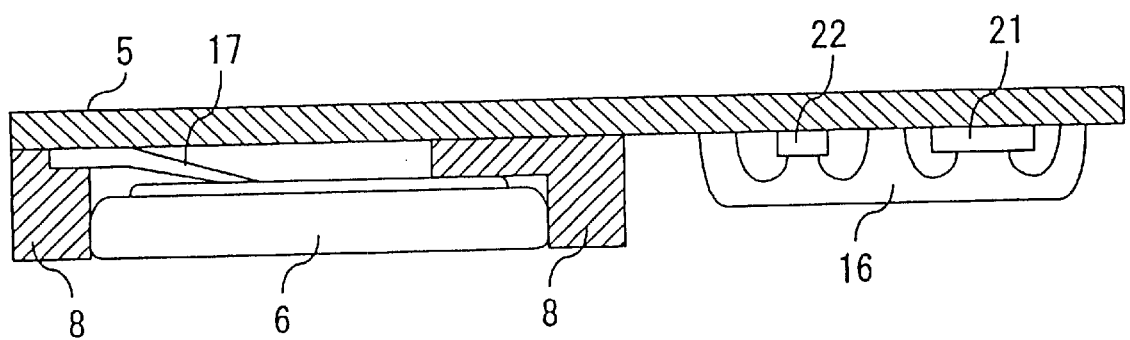
FIG. 6 is an explanatory sectional view taken along a line IIIB—IIIB of FIG. 5 (however, shown in a state in which left and right are inverted) for explaining the constitution of the parts of the electronic azimuth meter of FIG. 1.

By showing a state of integrating the battery 6 to the board 5 and the lower case 8 in FIG. 6 by a sectional view taken along a line IIIB—IIIB of FIG. 5 (however, left and right are reversed), the azimuth meter 1 is constituted to minimize sizes thereof in the X direction and the Y direction and minimize the thickness in the Z direction and therefore, the battery 6 is disposed to be proximate to the X-direction and the Y-direction magnetic sensors 21 and 22 substantially in the same horizontal face and when the battery 6 is magnetized, it is difficult to avoid that the noise magnetic field Bm influences on the detected and outputted values Vx and Vy by the X-direction and the Y-direction magnetic sensors 21 and 22. In FIG. 6, numeral 16 designates a resin portion for molding the X-direction and the Y-direction magnetic sensors 21 and 22 and numeral 17 designates a contact terminal on the side of the board 5 connected to the negative pole 11 of the battery 6.

As shown by FIG. 1, the main body 2 of the azimuth meter 1 is provided with a four reference azimuth data (fourth azimuth data) storing portion 40, an approximate equation storing portion 50, an approximate equation selecting and processing portion 60 and an azimuth calculating portion 70 in addition to the display portion 30. In this case, approximate equation storing means is constituted by the fourth azimuth data storing portion 40 and the approximate equation storing portion 50 and azimuth calculating means is constituted by the approximate equation selecting and processing portion 60 and the azimuth calculating portion 70.

The four azimuth data storing portion or the reference azimuth data storing portion 40 is stored with detected and outputted values of the X-direction and the Y-direction magnetic sensors 21 and 22 when the azimuth meter 1 is directed to respectives of four reference azimuths of north (refer to "magnetic north direction" so far as not particularly specified otherwise according to the specification, the same goes with other azimuths of east, south or west), east, south and west along with geomagnetic component data of the azimuths.

Further particularly, the reference azimuth data storing portion 40 is stored with detected and outputted values of Vx{0} and Vy{0} of the X-direction and the Y-direction magnetic sensors 21 and 22 when the azimuth meter 1 is directed in north, that is, azimuth of 0 degree, that is, Vx (Bx) and Vy (By) constituting Vx(Bx−max) and Vy(0), detected and outputted values Vx{90} and Vy{90} of the sensors 21 and 22 when the azimuth meter 1 is directed to west direction, that is, azimuth of 90 degree, that is, Vx(0) and Vx(By−max), detected and outputted values Vx{180} and Vy{180} of the sensors 21 and 22 when the azimuth meter 1 is directed in south direction, that is, azimuth of 180 degree, that is Vx(Bx−min) and Vy(0), and detected and outputted values Vx{270} and Vy{270} of the sensors 21 and 22 when the azimuth meter 1 is directed in east direction, that is, azimuth of 270 degree, that is Vx(0) and Vy(By−min) along with azimuth information. The azimuth information may be independent data or may be, for example, specific address, record or field of a memory or the like.

Further, with regard to geomagnetic component data of respective azimuths, that is, Bx{0}, Bx{90}, Bx{180}, Bx{270} and By{0}, By{90}, By{180}, By{270}, Bx{0}=−Bx {180}=By{90}=−By{270}=(magnitude of horizontal magnetic force B1) and Bx{90}=Bx{270}=By{0}=By{180}=0 and accordingly, with regard to Bx and By, there may be stored only the magnitude of the horizontal magnetic force B1 which differs depending on locations on the earth. In FIG. 1, as shown by an imaginary line 40a, there may be provided a table of the magnitude of B1 in accordance with an area on the earth and the horizontal magnetic force B1 (magnitude thereof) may be selected by selecting the area by coordinates of latitude, longitude or the like or country name or city name.

The fourth azimuth data Vx{0}, Vy{0}, Vx{90}, Vy{90}, Vx{180}, Vy{180}, Vx{270}, Vy{270} are updated by a four azimuth data update control portion 41 as necessary. That is, when desired as in the case of interchanging the battery 6, as described later in details, the fourth azimuth data are newly detected directly by the magnetic sensors 21 and 22 and detected and outputted values are updated and registered to the storing portion 40 as new four azimuth data.

The approximate equation storing portion 50 is provided with an X-direction approximate equation storing portion 51 and a Y-direction approximate equation storing portion 52. In this case, by giving a preference to easiness of understanding functions of the respective portions of the azimuth meter 1, an explanation will be given of a case in which approximate equations are previously calculated and a case of calculating approximate equations by utilizing the four reference azimuth data.

First, a specific explanation will be given of a relationship between the geomagnetic components Bx and By and the sensor detected values Vx and Vy in accordance with the azimuth in the azimuth meter 1 an outline structure of which has been shown in reference to FIG. 4 through FIG. 6, in reference to FIG. 14 and FIG. 15.

FIG. 15 shows actually measured data indicating a relationship between outside magnetic field in the Y-axis direction, that is, a Y-direction component By in the horizontal magnetic force B1 of the geomagnetism B0 and a detected output Vy of the Y-direction magnetic sensor 22 when the azimuth meter 1 or a portion thereof is directed in various azimuths in the horizontal face. In graphs of FIG. 15, black diamond points indicate the detected output Vy of the Y-direction magnetic sensor 22 in a state of only the circuit board 5 mounted with the magnetic sensor 20 having none of the battery 6 and the case back 9 in the azimuth meter 1 shown by FIG. 4 through FIG. 6 and lines connecting these are designated by notation 54a. Similarly, black square points indicate the detected output Vy of the sensor 22 in a state in which the exterior case 2a and the case back 9 are removed in the azimuth meter 1 (move) and lines connecting these are designated by notation 54b and white triangular points indicate the detected output Vy of the sensor 22 in a state in which the azimuth meter 1 is completely integrated (comp) and lines connecting these are designated by notation 54. As is apparent from the lines 54a, in the state having none of the battery 6 and the base back 9, the detected output Vy by the Y-direction magnetic sensor 22 is substantially in proportion to the Y-direction component By of the geomagnetism B0 and it is known that the Y-direction component By of the geomagnetism B0 can be detected directly and substantially accurately. Further, slight spread shows that there is a magnetic part which is a little magnetized in the circuit board 5 other than the battery 6 and the case back 9. Meanwhile, as is apparent by comparing the lines 54a, the lines 54b and the lines 54, presence or absence of the battery 6 significantly influences on the detected output Vy by the Y-direction magnetic sensor 22. That is, in detecting magnetic field by the Y-direction magnetic sensor 22, it is apparent that influence of magnetization of the battery 6 under the geomagnetism B0 cannot be disregarded. Further, as is apparent by comparing the lines 54b with the lines 54, presence or absence of the case back 9 or the like is difficult to disregard strictly. At any rate, according to the azimuth meter 1, by calculating the relationship between the Y-direction magnetic field component By of the geomagnetism B0 in correspondence with the azimuth of the azimuth meter 1 in the state of a completed product mounted with all of parts including magnetic parts having a possibility of influencing on the detected output Vy of the Y-direction magnetic sensor 22 and the detected output Vy of the Y-direction sensor 22, influence of the noise magnetic field Bm by the magnetic parts can firmly be evaluated and removed.

FIG. 14 shows graphs indicating a relationship between the X-direction component Bx of the geomagnetism B0 and a measured result Vx similar to that in FIG. 15 by the X-direction magnetic sensor 21. Also in this case, in the state having none of the battery 6 and the case back 9, as is apparent from lines 53a, the detected output Vx by the X-direction magnetic sensor 21 is substantially in proportion to the X-direction component Bx of the geomagnetism B0 and it is known that the X-direction component Bx of the geomagnetism B0 can be detected substantially directly and substantially accurately by the sensor 21. Meanwhile, similar to the case of FIG. 15, as is apparent by comparing the lines 53a, lines 53b and lines 53, presence or absence of the battery 6 effects influence which is difficult to disregard to a certain degree in the detected output Vx by the X-direction magnetic sensor 21. That is, in detecting magnetic field by the sensor 21, influence of magnetization of the battery 6 under the geomagnetism B0 cannot be disregarded. Further, as is apparent by comparing the lines 53b with the lines 53, presence or absence of the case back 9 is difficult to disregard strictly. According to the azimuth meter 1, by calculating the relationship between the X-direction magnetic field component Bx of the geomagnetism B0 in correspondence with the azimuth of the azimuth meter 1 in the state of a completed product mounted with all of parts including magnetic parts having a possibility of influencing on the detected output Vx of the X-direction magnetic sensor 21 and the detected output Vx of the X-direction sensor 21, influence of the noise magnetic field Bm by the magnetic parts can firmly be evaluated and removed.

Further, it seems that the influence of the battery 6 or the like is manifested more significantly in the detected output Vy of the Y-direction magnetic sensor 22 rather than the detected output Vx of the X-direction magnetic sensor 21 because the Y-direction magnetic sensor 22 is substantially more proximate to the battery 6 than the X-direction magnetic sensor, more in details, a substantial distance between the X-direction end edge 6a of the battery 6 which is liable to provide the noise magnetic field Bmy in the Y direction by magnetizing the battery 6 under the geomagnetism B0 (distance in consideration of direction and intensity of nonuniform magnetic field (the same goes with magnetic flux density)) is smaller than the substantial distance between the Y-direction end edge 6b of the battery 6 which is liable to provide the noise magnetic field Bmx in the X direction by magnetizing the battery 6 under the geomagnetism B0 and the X-direction sensor 21.

Figure 13:
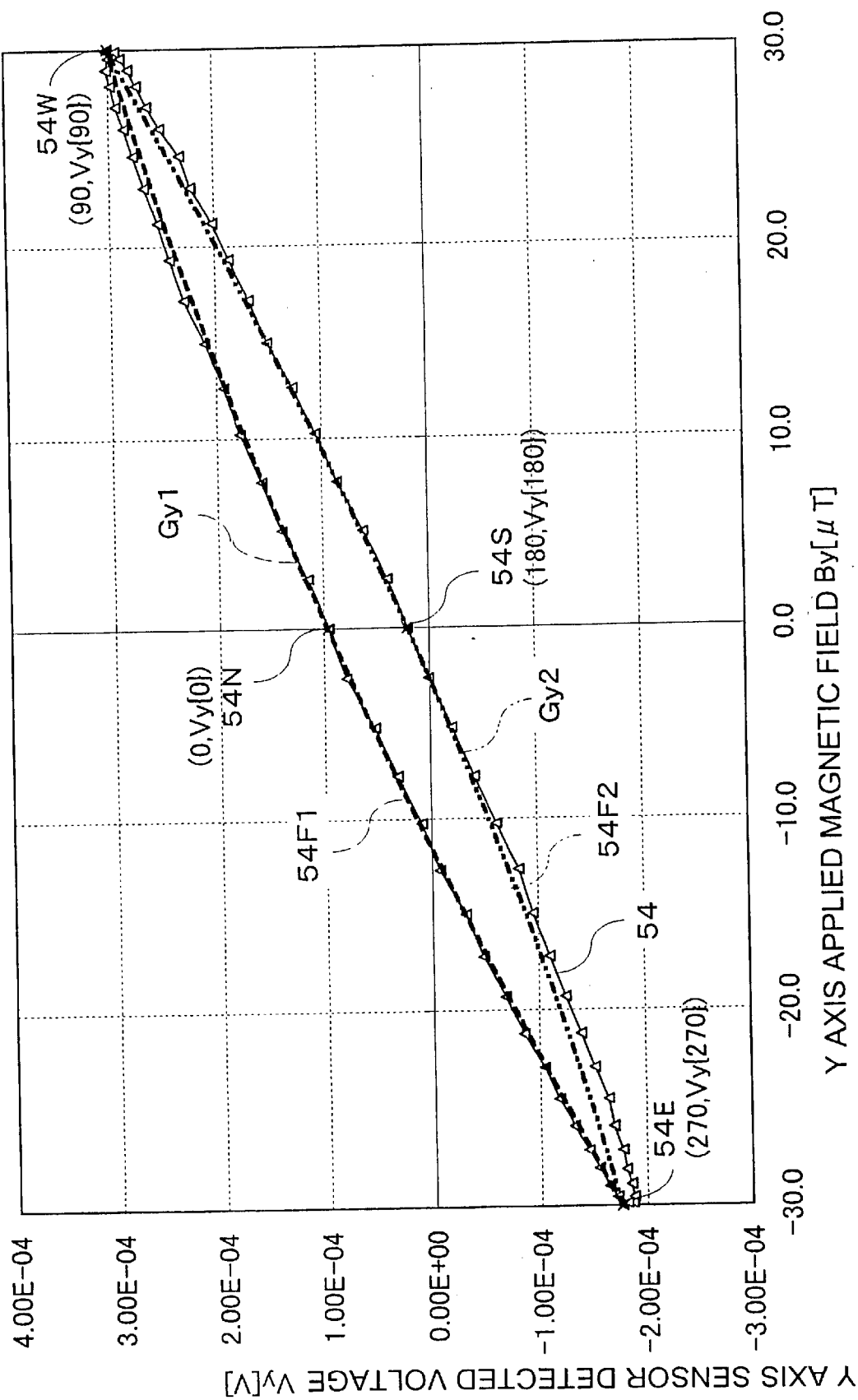
FIG. 13 is a graph showing a relationship between a Y-direction component By of geomagnetism and an output Vy of a Y-direction magnetic sensor and approximate equations with regard to the electronic azimuth meter of FIG. 1 (where with regard to vertical axis "E" designates numerical value "10")

Before explaining of forming or calculating an approximate equation in consideration of influence of the battery 6 or the like as mentioned above, firstly, a detailed explanation will be given of a characteristic in the Y direction. FIG. 13 shows actually measured points (that is, points representing measurement result) with regard to the azimuth meter 1 which is a completed product, that is, a product assembled with all the parts and the line 54 connecting these which are taken out from FIG. 15. In the line 54, a point 54W where By is maximized represents a measured point when the azimuth meter 1 is directed in west azimuth, that is, a direction where an azimuth angle $\phi$ is 90 degree (90 degree, Vy{90}), that is, (By–max, Vy(By–max)) and the detected output Vy of the sensor 22 substantially becomes a maximum value actually. Similarly, in the line 54, a point 54E where By is minimized, represents a measured point when the azimuth meter 1 is directed in east azimuth, that is, a direction where the azimuth angle $\phi$ is 270 degree (270 degree, Vy{270}), that is, (By–min, Vy(By–min)) and the detected output Vy of the sensor 22 substantially becomes a minimum value actually.

Meanwhile, a point 54N which is an upper side one of points where By is 0, represents a measured point when the azimuth meter 1 is directed in north direction, that is, a direction where the azimuth angle $\phi$ is 0 degree (360 degree) (0 degree, Vy{0}), that is, (0, Vy(0)), similarly, a point 54S which is a lower side one of the points where By is 0, represents a measured point when the azimuth meter 1 is directed in south direction, that is, a direction where the azimuth angle $\phi$ is 180 degree (180 degree, Vy{180}), that is, (0, Vy(0)).

In this case, there is produced a shift in the detected output Vy of the Y-direction magnetic sensor 22 between the case of being directed to north (point 54N) and the case of being directed to south (point 54S) since a magnetic part such as the battery 6 is magnetized under the geomagnetism B0 of By=0 (state in which the horizontal magnetic force B1 is directed in positive or negative direction of the X direction) and the noise magnetic field Bm (Bmx, Bmy, Bmz) by the magnetization, is provided with the Y-direction component Bmy which is not zero as exemplified by the imaginary line of FIG. 4 in the case of the point 54N. That is, with regard to, for example, the point 54N, the noise magnetic field Bm is provided with a component in an oblique direction relative to the horizontal magnetic force B1 in the X direction (azimuth angle is 0 degree).

Further, although the line 54a shown by FIG. 15 substantially passes through (0,0), the point 54N and the point 54S of FIG. 13 are shifted upwardly as a whole, which does not limit the scope of the invention but stating as one possibility, for example, seems to be caused by relative position in a three-dimensional space of the Y-direction magnetic sensor 22 and the end edge 6a of the battery 6 as shown by FIG. 4, that the geomagnetism B0 is provided with dip as large as about 50 degree, and an easy-to-magnetize axis or anisotropy of the peripheral edge rise portions 10b and 11b of the terminal plate portions 10 and 11 in the tray-like shape comprising thin plates of the battery 6 as shown by FIG. 7 depending on inclined direction and the shapes thereof. Further, similar shift can be produced also in the case in which a portion of the magnetic part portion of the battery 6 is magnetized even under zero magnetic field to a degree of indicating spontaneous magnetization of a total thereof and a magnetized state of the portion remains unchanged under weak magnetic field such as the geomagnetism B0 (which is a magnetized state that is magnetically hard to magnetic field of the geomagnetism or the like, for example, in which domain wall movement is not caused).

At any rate, in the case in which the noise magnetic field Bm having the Y-direction component Bmy that is not 0 is formed by presence of magnetic part having more or less ferromagnetism which is magnetically soft when the Y-direction component By of the geomagnetism B0 is 0, as shown by FIG. 13, By-Vy characteristic is constituted in a shape of a closed curve and therefore, it is apparent that the Y-direction component By of the geomagnetism B0 cannot uniquely be determined from the detected output Vy by the Y-direction sensor 22 only by the characteristic curve.

As an approximate equation, such that By=By(Vy) becomes a one-valued equation, in FIG. 13, the closed curve 54 is divided into a first area or section 54F1 indicated by a broken line connecting point 54E, point 54N and point 54W, and a second area or section 54F2 indicated by an imaginary line connecting point 54W, point 54S and point 54E and there are calculated first Y-direction approximate equation Gy1 with regard to the first area 54F1 and second Y direction approximate equation Gy2 with regard to the second area 54F2.

The approximate equation Gy1 is constituted by, for example, a quadratic curve passing through three points 54E, 54N and 54W or a polynomial of degree two with respect to By as follows.

$$Vy = Ay1 \cdot By^2 + Cy1 \cdot By + Dy1$$

(where Ay1, Cy1, Dy1 are constants, Ay1<0), and the approximate equation Gy2 is constituted by, for example, a quadratic curve passing three points 54W, 54S and 54E or a polynomial of degree two with respect to By $$Vy = Ay2 \cdot By^2 + Cy2 \cdot By + Cy2$$

(where Ay2, Cy2, Dy2 are constants, Ay2>0).

In this case, the respective constants are determined since the curves pass through the three points.

Further, in calculating the approximate equations Gy1, Gy2, the constants may be determined by the least squares method by using data of four or more of measured points, for example, a number of measured points as shown by FIG. 13.

In these cases, the two approximate equations Gy1, Gy2 are stored to the Y-direction approximate equation storing portion 52 along with the constants Ay1, Cy1, Dy1 and Ay2, Cy2, Dy2. Naturally, only the constants of the two approximate equations Gy1 and Gy2 may be stored to the Y-direction approximate equation storing portion 52 and the portion of the calculation equation of the polynomial of degree two may be stored to a common area of the approximate equation storing portion 50 such that the common area is commonly used by the X-direction approximate equation storing portion 51.

Further, data of three points in correspondence with three azimuths of four reference azimuths may be used and by Lagrangean approximation method, the approximate equations Gy1 and Gy2 may be calculated in the form of function of By=By1 (Vy), By=By2 (Vy). In this case, when with regard to the azimuth angle φ, 0 degree, 90 degree, 180 degree and 270 degree are respectively made to correspond to k=1, 2, 3 and 4, in the case of j=1, with regard to the azimuth angle φ, 270 degree, 0 degree and 90 degree respectively correspond to K=4, 1, 2 cyclically and therefore, m=4, n=2 and in the case of j=2, with regard to the azimuth angle φ, 90 degree, 180 degree and 270 degree respectively correspond to K=2, 3 and 4 cyclically and therefore, m=2 and N=4.

That is, as described above, Byj in correspondence with approximate equation Gyj is represented by $$Byj = By_k Fvy_k$$

$$Fvy_k = \Pi(Vy - Vy_p)/(Vy_k - Vy_p)$$

(where p is taken cyclically from lower limit to upper limit except p=k):
in the case of j=1, m=4, n=2, k is taken cyclically from 4 to 2 in the order of 4, 1, 2 and p is taken similarly cyclically from m=4 to n=2 and except p=k. Then, $$By1 = By_4 Fvy_4 + By_1 Fvy_1 + By_2 Fvy_2$$

where, $$Fvy_4 = (Vy - Vy_1)(Vy - Vy_2)/(Vy_4 - Vy_1)(Vy_4 - Vy_2)$$

$$Fvy_1 = (Vy - Vy_2)(Vy - Vy_4)/(Vy_1 - Vy_2)(Vy_1 - Vy_4)$$

$$Fvy_2 = (Vy - Vy_4)(Vy - Vy_1)/(Vy_2 - Vy_4)(Vy_2 - Vy_1)$$

similarly,
in the case of j=2, m=2, n=4, k is taken cyclically from 2 to 4 in the order of 2, 3, 4 and except P=k, p is taken similarly cyclically from m=2 to n=4. Then, $$By2 = By_2 Fvy_2 + By_3 Fvy_3 + By_4 Fvy_4$$

where, $$Fvy_2 = (Vy - Vy_3)(Vy - Vy_4)/(Vy_2 - Vy_3)(Vy_2 - Vy_4)$$

$$Fvy_3 = (Vy - Vy_4)(Vy - Vy_2)/(Vy_3 - Vy_4)(Vy_3 - Vy_2)$$

$$Fvy_4 = (Vy - Vy_2)(Vy - Vy_3)/(Vy_4 - Vy_2)(Vy_4 - Vy_3).$$

At this occasion, $By_1$, $By_2$, $By_3$, $By_4$ and $Vy_1$, $Vy_2$, $Vy_3$, $Vy_4$ respectively represent By{0}, By{90}, By{180}, By{270} and Vy{0}, Vy{90}, Vy{180}, Vy{270 }.

In this case, information of two kinds of which three azimuths are used in four reference azimuths and information of Y direction (for example, may be address per se of memory to be stored) are stored to the Y-direction approximate equation storing portion 52 and approximate equations by Lagrangean approximation method may be stored to the Y-direction approximate equation storing portion 52 or the approximate equation storing portion 50 common to the X direction and the Y direction.

Further, a polynomial of degree of three or more may be provided by Lagrangean approximation method by using data of measured points with regard to four or more azimuths for calculating the respective approximate equations Gy1 and Gy2. In that case, for example, in addition to the information of two kinds with regard to used azimuths in the four reference azimuths and the information of the Y direction, information with regard to measured points other than the reference azimuths may be stored to the Y-direction approximate equation storing portion 52 and calculation equations of Lagrangean approximation may be stored to the Y-direction approximate equation storing portion 52 or the approximate equation storing portion 50 common to the X direction and the Y direction.

Further, the above-described calculation or derivation of approximate equations may be carried out previously and separately and only the provided approximate equations may be stored or memorized to the approximate equation storing portion 50 and particularly, in the case of using data of special azimuths such as data of the reference fourth azimuths, in FIG. 1, an approximate equation calculating portion designated by notation 55 may be provided and a program of carrying out any of the above-described calculation may be executed by the calculating portion 55. The same goes with the X direction explained below. In this way, by providing the approximate equation calculating portion 55, as in the case of interchanging the battery, mentioned later, the data of the reference four azimuths may be updated and the approximate equations accompanied thereby may be updated, that is, calibration of the electronic azimuth meter can be carried out by the user.

Figure 12:
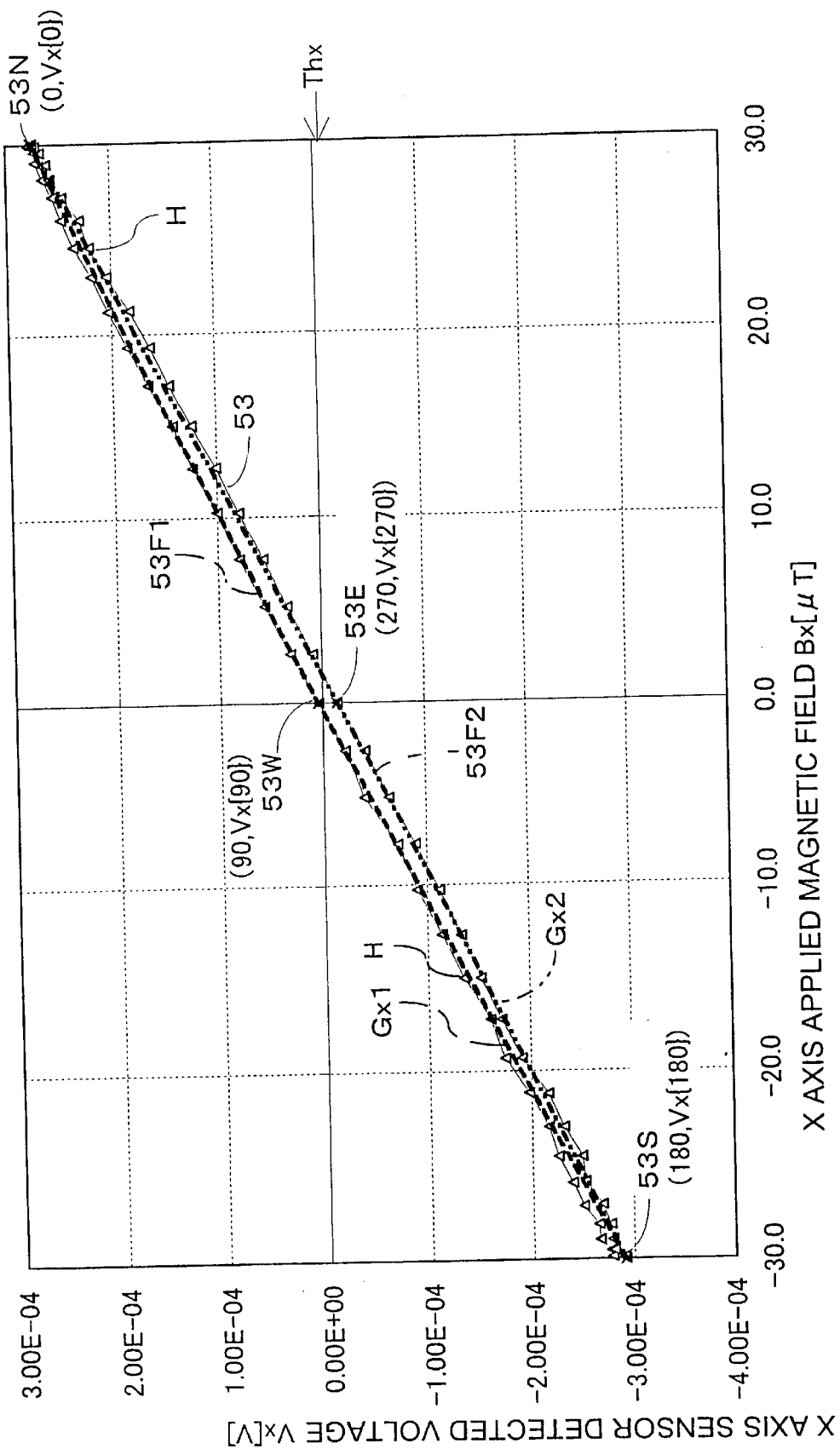
FIG. 12 is a graph showing a relationship between an X-direction component Bx of geomagnetism and an output Vx of an X-direction magnetic sensor and approximate equations with regard to the electronic azimuth meter of FIG. 1 (where with regard to vertical axis, "E" designates numerical value "10")

Also with regard to the X direction, as shown by FIG. 12 where the lines 53 are taken out from FIG. 14, based on four reference azimuth data of point 53N of azimuth angle of 0 degree (north) substantially providing a maximum value (0 degree, Vx{0}), point 53S of azimuth angle 180 degree (south) substantially providing a minimum value (180 degree, Vx{180}), point 53W of azimuth angle 90 degree (west) where the component Bx of the horizontal magnetic force becomes 0 (90 degree, Vx{90}) and point 53E of azimuth angle 270 degree (270 degree, Vx{270}), first X-direction approximate equation Gx1 (broken line on upper side of FIG. 12) with regard to a range 53F1 of azimuth angle 0 degree–90 degree–180 degree and second X-direction approximate equation Gx2 (imaginary line on lower side of FIG. 12) with regard to a range 53F2 of azimuth angle 180 degree–270 degree–0 degree (360 degree), are calculated in the form of polynomials of degree two passing through points of three reference azimuths related to each other as in the case of the Y direction, constant values of the respective polynomial approximate equations Gx1 and Gx2 are stored to the X-direction approximate equation storing portion 51 and the calculating portion of the polynomial is stored to the X-direction approximate equation storing portion 51 or the approximate equation storing portion 50 common to the X direction and the Y direction. Further, in place thereof, the approximate equations Gx1 and Gx2 may be calculated by the least squares method by using data of a number of measured points or the polynomial approximate equations of degree two or higher may be calculated by using Lagrangean approximation method similar to the above-described with regard to the Y direction.

Next, an explanation will be given of the approximate equation selecting and processing portion 60 in reference to a flowchart shown by FIG. 11.

According to the approximate equation selecting and processing portion 60, from the detected outputs Vx and Vy of the X-direction and the Y-direction magnetic fields detected by the X-direction and the Y-direction magnetic sensors 21 and 22, when the electronic azimuth meter 1 is directed in a desired azimuth, single approximate equations of the X-direction approximate equations Gxi (for example, Gx1, Gx2) and the Y-direction approximate equations Gyj (for example, Gy1, Gy2), are selected and based on the selected approximate equations, the magnetic field components Bx and By of the horizontal magnetic force B1 of the geomagnetism B0 in the azimuth are calculated. In selecting and calculating thereof, there are used four reference azimuth data stored to the four azimuth data storing portion 40 and the X-direction approximate equations Gxi and the Y-direction approximate equation Gyj stored to the approximate equation storing portion 50.

In FIG. 11, as shown by step S20, firstly, the electronic azimuth meter 1 is directed in a desired azimuth and the X-direction and the Y-direction magnetic fields are detected by the X-direction and the Y-direction magnetic sensors 21 and 22 to thereby provide the detected outputs Vx and Vy.

Further, as shown by step S40, a threshold Thx for determination with regard to the X direction is calculated by Thx=[(Vx{0}+Vx{180})]/2. Further, the threshold Thx may previously be calculated simultaneously with storing or updating data of the four reference azimuths and stored to a desired storing portion. At this occasion, a just middle value of the maximum value Vx{0} and the minimum value Vx{180} is calculated in order to avoid an error caused by producing a constant offset in the detected output of the magnetic sensor 20 (Thx is slightly shifted to the negative side as illustrated in FIG. 12) in the case in which, for example, magnetic parts are magnetized even under zero magnetic field. Further, the threshold is taken not in the Y direction but in the X direction since as is apparent from FIG. 12 and FIG. 13, curves represented by two approximate equations are proximate to each other in the X direction rather than in the Y direction. Further, owing to presence of deviation in the two approximate equations Gx1 and Gx2, for example, in the case in which the azimuth angle is slightly larger than 90 degree at a vicinity of 90 degree and in the case in which the azimuth angle is slightly smaller than 270 degree at a vicinity of 270 degree, strictly speaking, in later steps S61, S62 and S63, there is produced a deviation in selecting the Y-direction approximate equation, however, since the deviation between the X-direction approximate equations Gx1 and Gx2 is small, an error thereby is comparatively small.

Next, as shown by step S61, the detected output Vx by the X-direction magnetic sensor 21 provided at step S20 is compared with the threshold Thx, when Vx is equal to or larger than Thx, it is regarded that the azimuth angle falls in a range of 270 degree–0 degree–90 degree, that is, directed to north at least to some degree and the first Y-direction approximate equation Gy1 is selected as shown by step S62 and when Vx is smaller than Thx, it is regarded that the azimuth angle falls in a range of 90 degree–180 degree–270 degree, that is, directed to south at least to some degree and the second Y-direction approximate equation Gy2 is selected as shown by step S63. Further, naturally, in the case of Vx=Thx, the approximate equation Gy2 may be selected in place of the approximate equation Gy1.

Next, as shown by step S64, the selected approximate equation Gyj is read from the Y-direction approximate equation storing portion 52 and based on the approximate equation Gyj, the geomagnetism component By in the Y direction is calculated. Further, the approximate equation Gyj is stored to the Y-direction approximate equation storing portion 52 in a state of being inversely converted into the form of By=By(Vyj), that is, By=Byj(Vy). Specifically, with regard to By1, $By=\{-Cy1+Cy1^2-4 \cdot Ay1 \cdot Dy1)^{1/2}\}/2Ay1$ (in this case, Ay1<0), with regard to By2, $By=\{-Cy2+(Cy2^2-4 \cdot Ay2 \cdot Dy2)^{1/2}\}/2Ay2$ (in this case, Ay2>0). However, inverse conversion may be carried out after reading the approximate equation from the storing portion 52. Further, an approximate value may be calculated by repeating numerical calculation by CPU 80 (FIG. 8) without executing the inverse conversion.

Next, as shown by step S65, positive or negative of the calculated Y-direction component By of the geomagnetism is determined and in the case of the positive (or zero), it is regarded that the azimuth angle is directed to east at least to some degree and falls in a range of 0 degree–90 degree–180 degree and the first X-direction approximate equation Gx1 is selected as shown by step S66 and in the case of the negative, it is regarded that the azimuth angle is directed to west at least to some degree and falls in a range of 180 degree–270 degree–360 degree (0 degree) and the second X-direction approximate equation Gx2 is selected as shown by step S67. Also in this case, naturally, in the case of By=0, the approximate equation Gx2 may be selected in place of the approximate equation Gx1.

Next, as shown by step S68, the selected approximate equation Gxi is read from the X-direction approximate equation storing portion 51 and based on the approximate equation Gxi, the geomagnetism component Bx in the X direction is calculated. Further, also in this case, the approximate equation Gxi is stored to the X-direction approximate equation storing portion 51 in a state of being inversely converted to the form of Bx=Bx(Vxi), that is, Bx=Bxi(Vx). Further, also in this case, the inverse conversion may be carried out after reading the approximate equation from the storing portion 51 or an approximate value may be calculated by repeating numerical calculation by CPU 80 (FIG. 8) without executing the inverse conversion.

In this way, by step S20 through S68, with regard to respectives of the X direction and the Y direction, the pertinent approximate equations Gxi and Gyj are selected and the magnetic field components Bx and By in the X direction and in the Y direction of the geomagnetism B0 are calculated. Therefore, the approximate equation selecting and processing portion 60 comprises processing programs executed by a microprocessor or the like in order to execute processings of steps S61 through S68 in the above-described steps of S20 through S68.

The azimuth calculating portion 70 calculates the azimuth angle φ from the X-direction and the Y-direction components Bx and By of the geomagnetism B0 calculated in this way by the following equation.

$$\phi = \arctan(By/Bx)$$

The calculation of the function arctan is approximated by a desired polynomial which is easy to converge and is integrated to an azimuth calculating program for calculating the azimuth angle φ. The azimuth angle φ calculated in this way is converted into geographical azimuth angle θ (in this specification, referred to as "display azimuth angle θ") as θ=360−φ and azimuth display in accordance with angle ranges of φ or θ (for example, 16 azimuths N, NNE, NE, ENE, E, ESE, SE, SSE, S, SSW, SW, WSW, W, WNW, NW, NNW) is selected from a conversion table previously stored to a storing portion along with the azimuth calculation program and is displayed at the display portion 30 (step S30).

Figure 8:
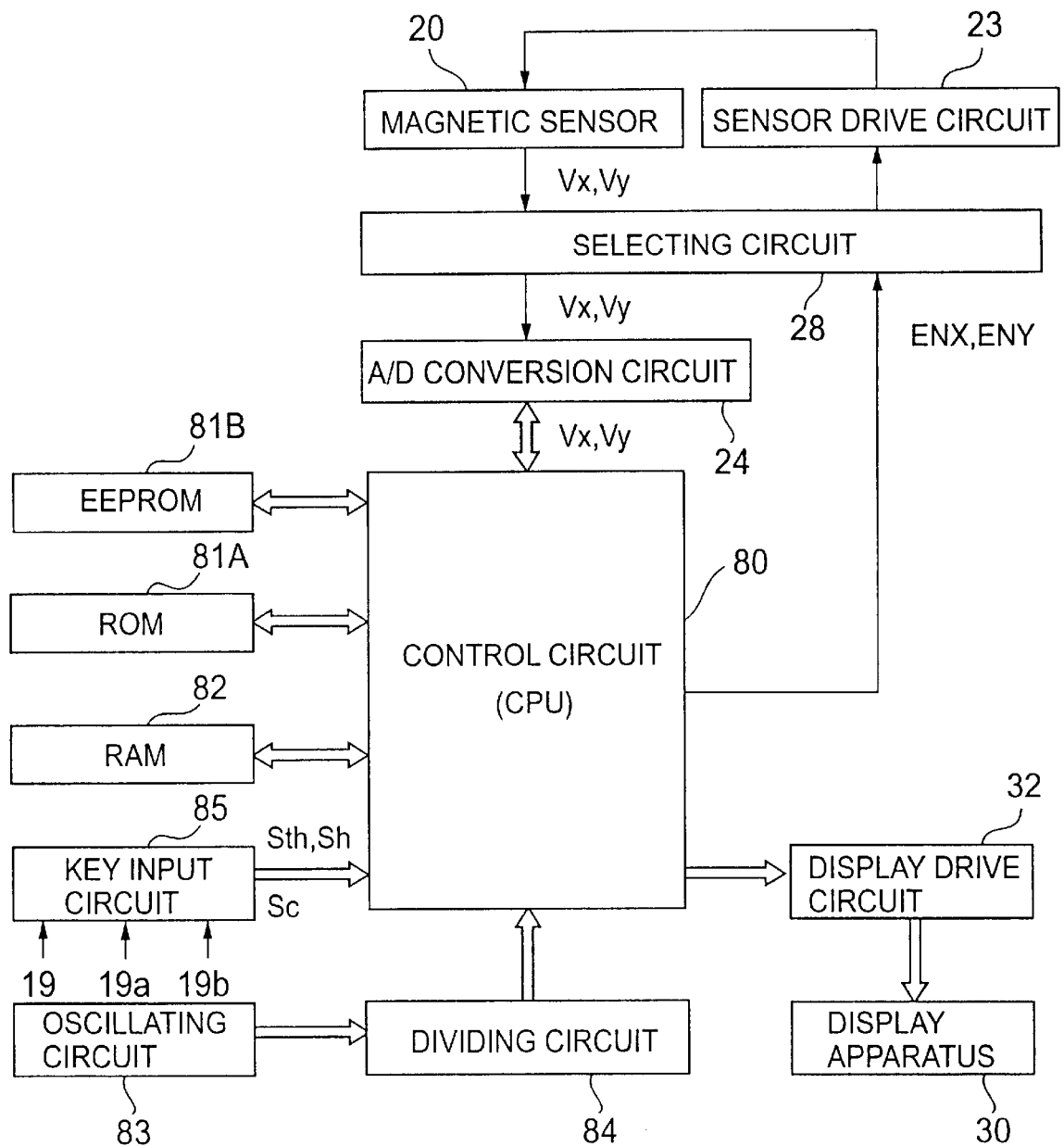
FIG. 8 is a block diagram of a hardware constitution of the electronic azimuth meter of FIG. 1.

From a view point of hardware constitution, as shown by FIG. 8, in addition to the magnetic sensor 20, the electronic azimuth meter 1 having the above-described function and constitution, is provided with, for example, a microcomputer main body portion comprising the calculation control portion 80 such as a microprocessor main body (CPU), a writable memory or RAM 82 and a non-volatile memory 81 such as ROM including EEPROM, an oscillating circuit 83, a dividing circuit 84, a key input circuit 85, a sensor drive circuit 23 for controlling to drive the magnetic sensor 20, an A/D conversion circuit 24 and a selecting circuit 28 for subjecting an output from the magnetic sensor 20 to A/D conversion and providing a converted signal to CPU 80, the display apparatus 30 and a drive circuit 32 thereof.

The non-volatile memory 81 is stored with magnitude of the horizontal magnetic force B1, data of detecting magnetic fields of the X-direction and the Y-direction magnetic sensors with regard to four azimuths constituting the reference azimuths, the approximate equations per se, a selecting and processing program of the approximate equation selecting and processing portion 60, azimuth calculating equations or calculation programs of the azimuth angle calculating portion 70 and constitute portions of the four azimuth data storing portion 40, the approximate equation storing portion 50, the approximate equation selecting and processing portion 60 and the azimuth calculating portion 70. Further, data of four azimuths constituting the reference azimuths and constant values of the approximate equations (in the case of not executing Lagrangean interpolation) are stored to the writable non-volatile memory 81 such as, for example, EEPROM or flash memory such that these can be updated by calibration. Meanwhile, portions of the approximate equation selecting and processing portion 60 and the azimuth calculating portion 70 are used for executing related programs and realized by RAM 82 temporarily stored with the calculated geomagnetism components Bx and By in the X direction and the Y direction and the calculated display azimuth angle θ.

The key input circuit 85 transmits a signal Sth for switching two modes of a time piece mode and an azimuth meter mode in accordance with depressing the push button switch 19 (FIG. 1) for instructing to switch the modes and an azimuth measurement start signal Sh to CPU 80. The oscillating circuit 83 and the dividing circuit 84 provide a clock signal for controlling timings of operating CPU 80 and executing respective instruction of program by CPU 80, a signal of controlling a timing of reading an input signal by the key input circuit 85 and various timings or clock signals in operation in the time piece mode.

Figure 9:
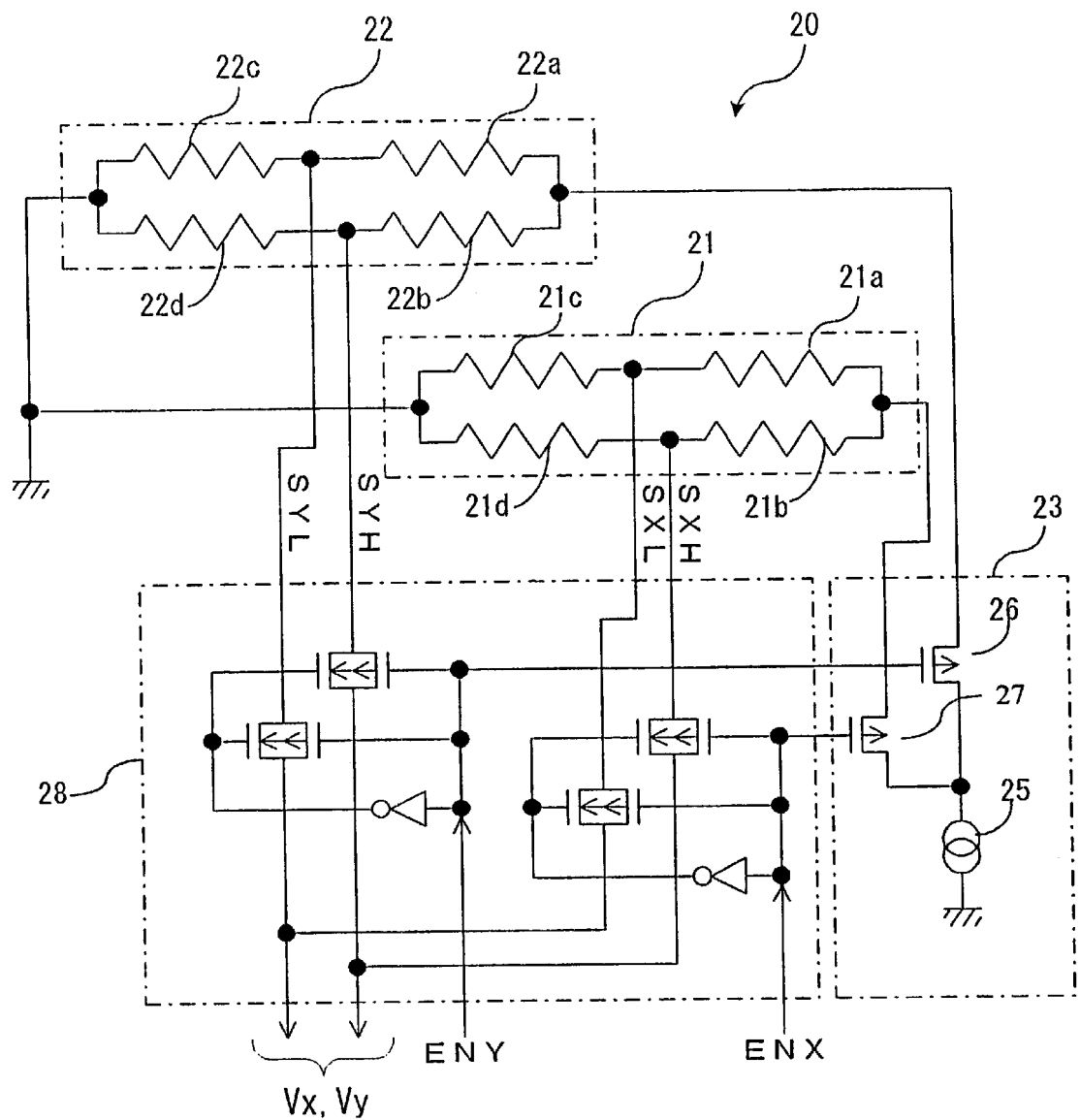
FIG. 9 is an explanatory view of a circuit constitution of a magnetic sensor of the electronic azimuth meter of FIG. 1.

Further, as shown by FIG. 9, the sensor drive circuit 23 is provided with a power source 25 for the X-direction and the Y-direction magnetic sensors 21 and 22 and FET switches 26 and 27 for connecting the power source 25 to the bridge circuits of the sensors 21 and 22. The power source 25 may be a constant current power source as illustrated or a constant voltage power source in place thereof. Timings of detecting the magnetic field by the magnetic sensor 20 comprising the X-direction and the Y-direction magnetic sensors 21 and 22 and reading a result of detection, are controlled by the selecting circuit 28. The selecting circuit 28 is provided with signals ENX and ENY for controlling timings of making ON the FET switches 26 and 27 for selectively feeding power from the power source 25 to respectives of the X-direction and the Y-direction magnetic sensors 21 and 22 of the magnetic sensor 20. Further, under control of the signal ENX, the selecting circuit 28 takes out outputs SXL and SXH of two middle points of the bridge of the X-direction magnetic sensor 21 only when power is fed to the X-direction magnetic sensor 21 and provides a difference output Vx=SXH−SXL to the A/D conversion circuit 24 as the sensor output Vx, and takes out two outputs SYL and SYH of two middle points of the bridge of the Y-direction magnetic sensor 22 only when power is fed to the Y-direction magnetic sensor 22 and provides a difference output Vy=SYH−SYL to the A/D conversion circuit 24 as the sensor output Vy. By the selecting circuit 28, power is fed to the magnetic sensor 20 only in measuring operation and the output is taken out therefrom to thereby restrain power consumption of the battery 6 to minimum. By shifting timings of the signals ENX and ENY, timings of operating the X-direction magnetic sensor 21 and the Y-direction magnetic sensor 22 are shifted from each other to thereby enable to avoid a concern of mutual interference even when the two sensors 21 and 22 are disposed to be proximate to each other.

An explanation will be given of manipulation and operation of the electronic azimuth meter 1 constituted as described above.

In normally measuring azimuth, the push button switch 19 shown by FIG. 1 and FIG. 8 is depressed, the switch signal Sth is provided to CPU 80 via the key input circuit 85 and the display portion 30 is switched from the time piece mode of time display to the azimuth meter mode of azimuth display. Next, the azimuth meter 1 is placed horizontally and directed to a desired azimuth, the push button switch 19 is depressed again and the azimuth measurement start signal Sh is provided to CPU from the key input circuit 85. Naturally, it may be constituted that other push button switch or the like is provided and the azimuth measurement start signal Sh is outputted from the key input circuit 85 in accordance with depression of the other push button switch, or by depressing the push button switch 19 secondly, the signal Sth similar to that in the first time is outputted from the key input circuit 85 and the second Sth signal is determined as the azimuth measurement start signal Sh by CPU 80.

When CPU 80 receives the azimuth measurement start signal Sh, CPU 80 provides the X-direction magnetic sensor operating signal ENX to the selecting circuit 28 and makes the X-direction magnetic sensor 21 detect the X-direction magnetic field via the sensor drive circuit 23 and takes the difference output Vx of the bridge of the sensor 21 via the selecting circuit 28. After finishing to read the output Vx in synchronism with the X-direction magnetic sensor operating signal ENX, CPU 80 provides the Y-direction magnetic sensor operating signal ENY to the selecting circuit 28 at a predetermined timing in correspondence with a timing pulse from the dividing circuit 84 and makes the Y-direction magnetic sensor 22 detect the magnetic field via the sensor drive circuit 23 and receives the difference output Vy of the bridge of the sensor 22 via the selecting circuit 28.

The analog difference output Vx from the X-direction magnetic sensor 21 is A/D-converted by the A/D conversion circuit 24 and thereafter transmitted to CPU 80 as the X-direction magnetic field detected output value Vx of the X-direction magnetic sensor 21. Similarly, also the analog difference output Vy from the Y-direction magnetic sensor 22, is A/D-converted by the A/D conversion circuit 24 and is transmitted to CPU 80 as the Y-direction magnetic field detected output value Vy of the Y-direction magnetic sensor 22. In this way, the magnetic fields Vx and Vy are detected by the magnetic sensors 21 and 22 as shown by step S20 of FIG. 11.

Next, the approximate equation selecting and processing portion 60 carries out calculation processing of the threshold Thx at step S40 of FIG. 11. The processing is carried out by making RAM 82 read a related program in ROM 81A and executing a threshold calculation program by reading the X-direction magnetic field data Vx{0} and Vx{180} of north azimuth and south azimuth in EEPROM 81B from the four azimuth data storing portion 40 of EEPROM 81B.

The approximate equation selecting and processing portion 60 carries out the comparison processing at step S61, determines whether the azimuth is proximate to north azimuth or proximate to south azimuth and carries out a processing of selecting the approximate equation Gy1 in accordance with step S62 when the azimuth is proximate to north azimuth and selecting the approximate equation Gy2 in accordance with step S63 when the azimuth is proximate to south azimuth. The comparison and determination processing at step S61 is carried out by executing a determination processing routine read from ROM 81A to a predetermined area of RAM 82 based on data Vx and Thx provided at steps S20 and S40 and temporarily stored to a predetermined operational area of RAM 82. Here, notation Thx designates a middle point of point 53N and point 53S in the vertical axis direction in FIG. 12 and indicates a position in the vertical axis Vx direction as indicated by an arrow mark Thx in FIG. 12.

For example, assuming that azimuth to be measured is azimuth angle of 120 degree, the azimuth is (120 degree, Vx{120}), that is, (−15, Vx(−15)) (where magnetic field is of a unit of $\mu$T) and accordingly, the azimuth is to be disposed at a position indicated by point H in FIG. 12 and accordingly, point H is disposed to be lower than the position Thx and Vx is smaller than Thx and therefore, at step S61, the determination is "No", the operation proceeds to step S63 and the Y-direction approximate equation Gy2 is selected. As a result, the approximate equation Gy2 is read from the Y-direction approximate equation storing portion 52 of the approximate equation storing portion 50 in EEPROM 81B to the predetermined area of RAM 82 and is executed.

According to the program of the approximate equation selecting and processing portion 60, next, the operation proceeds to step S64 and based on the read approximate equation Gy2, By is calculated from the Y-direction magnetic field measured value Vy. That is, Vy2=Vy in Vy2=Vy2 (By) produced by inversely converting By=By(Vy2) of the approximate equation Gy2 to thereby calculate the Y-direction magnetic field component By of the geomagnetism. Here, the approximate equation Gy2 is the one-valued function in correspondence with the area 54F2 at the lower half of the graph of FIG. 13 and accordingly, with respect to the detected output Vy of the Y-direction magnetic sensor 22, the Y-direction component By of the geomagnetism is uniquely determined and calculated. By calculated in this way is to be a value in accordance with the position of 120 degree, that is, substantially 30 cos 120°−26($\mu$T) and to be at a position indicated by point H (120 degree, Vy{120}), that is, (26, Vy(26)) in $\mu$T unit in FIG. 13.

According to the program of the approximate equation selecting and processing portion 60, next, the operation proceeds to step S65, by whether the Y-direction component By of the geomagnetism calculated at step S64 is negative or not, it is determined whether the direction of the geomagnetism is proximate to 3 o'clock direction or proximate to 9 o'clock direction and when the direction of the geomagnetism is proximate to 9 o'clock direction, the X-direction approximate equation Gx2 is selected, and in the opposite case, the X-direction approximate equation Gx1 is selected. In this example, By is positive and proximate to 3 o'clock direction and accordingly, the operation proceeds to step S66, the X-direction approximate equation Gx1 is selected and the approximate equation Gx1 is read to selected memory or RAM 82 and is executed.

According to the program of the approximate equation selecting and processing portion 60, next, the operation proceeds to step S68, similar to the case of step S64, based on the approximate equation Gx1, from Bx=Bx(Vx1), Vx1=Vx, the X-direction magnetic field component Bx of the geomagnetism is calculated.

The X-direction and the Y-direction magnetic field components Bx and By of the geomagnetism B0 calculated by the approximate equation selecting and processing portion 60, are provided to the azimuth calculating portion 70, in the azimuth calculating portion 70, by $\phi=\arctan(By/By)$, the azimuth calculation processing is carried out, azimuth $\phi$ is calculated, further, the display azimuth angle $\theta$ is calculated by calculation of $\theta=360-\phi$. The calculation processing of the azimuth calculating portion 70 is carried out by executing the azimuth calculation program for carrying out the above-described two calculation processings in the processing of step S70 of FIG. 11. Further, calculation of arctan is typically carried out by using a desired approximate polynomial which is easy to converge as mentioned above. Although in the above-described, after calculating the angle $\phi$ which is referred to as azimuth or azimuth angle in this specification, angle $\phi$ is converted into azimuth angle in accordance with geographical definition, that is, display azimuth angle $\theta$, in all of the processings or in a portion of the processings, the azimuth angle may be represented by the angle $\theta$ in place of the angle $\phi$ and the angle $\theta$ may directly be calculated.

In this way, 16 azimuths are determined based on the calculated azimuth angle $\phi$ (or display azimuth angle $\theta$) and is displayed by the display portion 30 along with the azimuth angle.

As described above, according to the electronic azimuth meter 1, the magnetic parts such as the battery 6 and the like are present to be proximate to the magnetic sensor 20 and accordingly, the X-direction magnetic field component Bx of the geomagnetism B0 does not constitute a one-valued function of the detected output Vx of the X-direction magnetic sensor 21, the X-direction magnetic field component Bx of the geomagnetism B0 is not uniquely determined only from the single detected output value Vx, similarly, the Y-direction magnetic field component By of the geomagnetism B0 does not constitute a one-valued function of the detected output Vy of the Y-direction of the magnetic sensor 21, the Y-direction magnetic field component By of the geomagnetism B0 is not uniquely determined only from the single detected output value Vy, however, by combining the both, the X-direction and the Y-direction magnetic field components Bx and By of the geomagnetism B0 can be calculated actually firmly and actually accurately.

Further, in the case of interchanging the battery 6 or temporarily taking out and recharging the battery 6 for some reason, in view of the coordinate system X-Y fixed to the azimuth meter main body 2, there is a concern that the characteristic of the noise magnetic field Bm formed by the battery 6 differs from the previous one and accordingly, it is preferable to sample again data of the four azimuths constituting the references and calculate again the approximate equations.

For that purpose, as shown by FIG. 10, it is preferable to prepare a calibration mode or a mode of updating the reference data and the approximate equations in the azimuth meter 1. The calibration mode is started by further providing an instruction switch such as, for example, a push button switch designated by notation 19a in FIG. 1, setting the azimuth meter mode by the push button switch 19 and thereafter, further depressing the push button switch 19a to thereby provide a calibration mode or updating mode start signal Sc to CPU 80 via the key input circuit 85. According to the calibration mode, for example, every time of depressing a calibration start switch 19b, the ENX and ENY signals are outputted from CPU 80 and the detected outputs Vx and Vy of the X-direction and the Y-direction magnetic sensors 21 and 22 in accordance with azimuth of the electronic azimuth meter 1 at the time point, are stored to the predetermined operational area of RAM 82. That is, in FIG. 1, there is provided the calibration control portion 41 as the four azimuth data and approximate equation update control portion and when the switch 19a is depressed, the ENX and ENY signals are provided to the X-direction and the Y-direction magnetic sensors 21 and 22 via the calibration control portion 41 and the sensor outputs Vx and Vy at the time point are read to the calibration control portion 41.

Therefore, the user sets the azimuth meter mode and thereafter, directs 12 o'clock direction of the azimuth meter firstly to, for example, north and depresses the switch 19a. Thereby, the detected outputs Vx{0} and Vy{0} of north azimuth are outputted from the X-direction and the Y-direction magnetic sensors 21 and 22 and are held at a predetermined temporarily storing portion of the calibration control portion 41 (step S91 of FIG. 10). Next, by carrying out the similar processing by directing 12 o'clock direction of the azimuth meter to west, the detected outputs Vx{90} and Vy{90} of west azimuth are held at the predetermined temporarily storing portion of the calibration control portion 41 (step S92) and by carrying out the similar processing by directing 12 o'clock direction of the azimuth meter to south, the detected outputs Vx{180} and Vy{180} of south azimuth are held at the predetermined temporarily storing portion of the calibration control portion 41 (step S93) and finally, by carrying out the similar processing by directing 12 o'clock direction of the azimuth meter to east, the detected outputs Vx{270} and Vy{270} of east azimuth are held at the predetermined temporarily storing portion of the calibration control portion 41 (step S94).

Next, based on the newly detected four azimuth data, the X-direction and the Y-direction approximate equations Vxi, Vyj are calculated by executing a calculation similar to the above-described calculation by the approximate equation calculating portion 51 (step S95), finally, by store instruction by depressing the switch 19a or 19b, the four azimuth data and the related approximate equations in the fourth azimuth data storing portion 40 and the approximate equation storing portion 50, are rewritten (step S96).

Further, the four azimuth data or the approximate equations may be stored at each detection or calculation. Further, in detecting the four azimuth data, while the user is turning by one rotation, peak values of detected magnetic fields by the X-direction and the Y-direction magnetic sensors may be determined and sampled successively automatically.

Next, an explanation will be given of a second embodiment according to the invention centering on points of difference from the embodiment initially explained (first embodiment) based on the second embodiment shown in FIG. 16 through FIG. 20. Further, elements actually the same as elements of the first embodiment are attached with the same notations, elements similar thereto are attached with "1" before reference notations and new elements are designated by attaching "2" before reference notations.

As a result of carrying out further experimental verification and analysis with regard to the Bx–Vx characteristic and the By–Vy characteristic shown in FIG. 12 and FIG. 13, the inventors have found approximate equations capable of reflecting the influence by the noise magnetic field Bm further accurately and carrying out calibration further accurately.

That is, the inventors have found that the X-direction magnetic field measured value Vx=Vx{φ} and Y-direction magnetic field measured value Vy=Vy{φ} are provided with dependency characteristics as shown by FIG. 16 with regard to the azimuth angle φ. Graphs shown by FIG. 16 (where the amplitude of the vertical axis is normalized to 1) are provided with two characteristics FT1 and FT2 described below by gross classification.

The first characteristic FT1 is as follows.

The azimuth dependency Vx=Vy{φ} of the X-direction magnetic field detected value Vx is shifted in its phase by δx (<0) relative to cosine curve with regard to the azimuth angle φ and azimuth angle dependency VyγVy{φ} of the Y-direction magnetic field detected value Vy is shifted in its phase by δy (>0) relative to sine curve with regard to the azimuth angle φ.

In other words, Vx=Vx{φ} actually coincide with the cosine curve except that the phase is shifted by δx (<0) and Vy=Vy{φ} actually coincide with the sine curve except that the phase is shift by δy (>0).

Here, positive or negative direction and magnitude of the phase shift δx and δy are dependent on relative positions, that is, directions and distances of the X-direction and the Y-direction sensors 21 and 22 relative to the battery 6.

The second characteristic FT2 is as follows.

When the battery 6 having a different spontaneously magnetized state (magnetism bearing state) is contained, although degrees of shift (deviation) of Vx and Vy in the vertical axis direction as shown by FIG. 14 and FIG. 15 are varied, when respectives of Vx{φ} and Vy{φ} are normalized (for example, maximum value is +1 and minimum value is −1) to thereby remove influence of the degree of shift as shown by FIG. 16, even when the battery 6 is interchanged, or a direction (rotational position) of the button battery 6 in the circular disk shape is changed, δx and δy do not change significantly but actually maintain constant.

Further, the electronic azimuth meter main body 2 including the circuit board 5 and the like is not switched.

By presence of the shift of the phase angle or the phase differences δx and δy, at locations where the azimuth angle φ is 0 degree and 180 degree, the X-direction magnetic field detected value Vx is not provided with a maximum value $Vx_M$ and a minimum value $Vx_M$ and similarly, at location where the azimuth angle φ is 90 degree and 270 degree, the Y-direction magnetic field detected value Vy are not provided with a maximum value $Vy_M$ and a minimum value $Vy_m$. In other words, even when there are calculated directions where the magnetic field detected values Vx and Vy are provided with the maximum values $Vx_M$ and $Vy_M$ and the minimum values $Vx_m$ and $Vy_m$, the directions are shifted from the directions where the azimuth angle φ is 0 degree, 90 degree, 180 degree and 270 degree and accordingly, in the case in which approximate equations are determined or calibration is carried out by implicitly assuming that "direction where the magnetic field detected values Vx and Vy are provided with the maximum values $Vx_M$ and $Vy_M$ and the minimum values $Vx_m$ and $Vy_m$, coincide with the directions where the azimuth angle φ is 0 degree, 90 degree, 180 degree and 270 degree", an error is included from the start. As is apparent from FIG. 16, the error is significant with regard to the magnetic field detected values at vicinities of azimuths where the geomagnetic component becomes zero such as vicinities of Vy{0}, Vx{90}, Vy{180}, Vx{270} at which dVx/dφ and dVy/dφ are increased rather than vicinities of maximum values and minimum values of Vx and Vy. Therefore, when influence of the phase shifts δx and δy is removed, further accurate azimuth measurement can be carried out.

Therefore, an explanation will initially be given of a way of calculating approximate equations in consideration of the phase shifts δx and δy, an explanation will successively be given of an electronic azimuth meter using the approximate equations and an explanation will further be given of a way of carrying out calibration by using the azimuth meter.

When the phase differences or phase shifts δx and δy are considered, approximate equations are generally given as follows.

$$Bxn = \cos\varphi = \cos(\beta x + \delta x) \quad \text{Equation (1)}$$

$$Byn = \sin\varphi = \sin(\beta y + \delta y) \quad \text{Equation (2)}$$

In these equations, βx and βy are βx=φ−δx and βy=φ−δy with regard to the azimuth angle φ and notations Bxn and Byn represent geomagnetism magnetic field components Bx and By in the X and the Y directions where the amplitude is normalized to 1.

Meanwhile, also with regard to the magnetic field detected values Vx and Vy, there are considered Vxn and Vyn respectives of which are normalized such that middle values of maximum values and minimum values of Vx and Vy constitute reference values and the amplitude becomes 1. That is, putting, $$Vxr = Vx - \{(Vx_M)+(Vx_m)\}/2 \quad \text{Equation (3)}$$

$$Vyr = Vy - \{(Vy_M)+(Vy_m)\}/2 \quad \text{Equation (4)}$$

(where $Vx_M$ and $Vy_M$ are maximum values of Vx and Vy and $Vx_m$ and $Vy_m$ are minimum values of Vx and Vy), then Vxn and Vyn are given as follows.

$$Vxn = Vxr/[\{(Vx_M)-(Vx_m)\}/2] \quad \text{Equation (5)}$$

$$Vyn = Vyr/[\{(Vy_M)-(Vy_m)\}/2] \quad \text{Equation (6)}$$

Here, setting $$\alpha x = \arccos(Vxn) \quad \text{Equation (7)}$$

(where a range of one-valued function is set to 0 degree ≦ αx ≦ 180 degree)

$$\alpha y = \arcsin(Vyn) \quad \text{Equation (8)}$$

(where a range of one-valued function is set to −90 degree ≦ αx ≦ 90 degree)

With regard to Y-axis direction, $$\beta y = 180 - \alpha y \quad \text{(when } Vxn<0\text{)} \quad \text{Equation (9)}$$

$$\beta y = \alpha y \quad \text{(when } Vxn \geq 0 \text{ and } Vyn \geq 0\text{)} \quad \text{Equation (10)}$$

$$\beta y = y + 360 \quad \text{(when } Vxn \geq 0 \text{ and } Vyn<0\text{)} \quad \text{Equation (11)}$$

With regard to X-axis direction, $$\beta x = 360 - \alpha x \text{ (when Vyn} < 0 \text{ or sin}(\beta y - \delta y) < 0) \quad \text{Equation (12)}$$

$$\beta x = \alpha x \text{ (when Vyn} \geq 0 \text{ or sin}(\beta y - \delta y) \geq 0) \quad \text{Equation (13)}$$

Further, with regard to $\delta x$ and $\delta y$, as is apparent from FIG. 16 and property of sine function, $$\sin \delta x = Vxn\{90\} = -Vxn\{270\}$$

$$\cos \delta x = Vxn\{0\} = -Vxn\{180\}$$

therefore, since $\tan \delta x$ is given by, for example, following $$\tan \delta x = (Vxn\{90\} - Vxn\{270\})/(Vxn\{0\} - Vxn\{180\}) \quad \text{Equation (14)}$$

further $$\sin \delta y = Vyn\{0\} = -Vyn\{180\}$$

$$\cos \delta y = Vyn\{90\} = -Vyn\{270\}$$

therefore, since $\tan \delta y$ is given by, for example, following $$\tan \delta y = -(Vyn\{0\} - Vyn\{180\})/(Vyn\{90\} - Vyn\{270\}) \quad \text{Equation (15)}$$

from Equation 14, $$\delta x = \arctan[(Vxn\{90\} - Vxn\{270\})/Vxn\{0\} - Vxn\{180\}]] \quad \text{Equation (16)}$$

further, from Equation 15, $$\delta y = \arctan[-(Vyn\{0\} - Vyn\{180\})/Vyn\{90\} - Vyn\{270\}]] \quad \text{Equation (17)}$$

thereby, $\delta x$ and $\delta y$ are calculated. In this case, $\delta x$ and $\delta y$ may be calculated from two azimuth data in place of four azimuth data. However, for example, in the case in which original detected values of Vx and Vy are used and respective data are accompanied by offset values by A/D conversion or the like, the offset values can be canceled by taking differences between two values at denominators or numerators as in Equation (16) and Equation (17).

Therefore, the azimuth angle $\phi$ is calculated as follows from Bxn and Byn provided from Equations (1) and (2) similar to the above-described example.

$$\phi = \arctan(Byn/Bxn) \quad \text{Equation (18)}$$

Next, an explanation will be given of an electronic azimuth meter 101 using the above-described approximate equations in reference to FIG. 17 similar to FIG. 1, mentioned above.

The electronic azimuth meter 101 is provided with a phase difference data calculating portion 201 and a phase difference data storing portion 202. The phase difference data calculating portion 201 calculates the phase differences $\delta x$ and $\delta y$ based on Equation (16) and Equation (17), mentioned above, from the four azimuth data $Vx\{0\}$, $Vx\{90\}$, $Vx\{180\}$, $Vx\{270\}$ and $Vy\{0\}$, $Vy\{90\}$, $Vy\{180\}$, $Vy\{270\}$ detected by the X-direction and the Y-direction magnetic sensors 21 and 22 when the electronic azimuth meter 101 is directed predetermined four azimuths in a horizontal face while being held horizontally and stores the phase differences to the phase difference data storing portion 202. The phase differences, that is, phase shifts $\delta x$ and $\delta y$ are amounts which are actually inherent to respective individuals of the respective electronic azimuth meter 101 and are not actually changed even when the battery 6 is switched and therefore, before delivery of products, the supplier of the products may measure the amounts in a factory and store the amounts to the storing portion 202. Further, when difference of the respective individual of the product can actually be disregarded within the same kind (model), constant standard values may be set to the respective kind as $\delta x$ and $\delta y$. Therefore, the four azimuth information which is difficult to obtain by the user accurately in the field, may be obtained in the factory having an organized facility and therefore, there is no difficulty in this regard. Further, the phase differences $\delta x$ and $\delta y$ are amounts which are not basically changed after determined once and accordingly, the phase difference data calculating portion 201 may not be provided in the electronic azimuth meter 101, the phase difference data $\delta x$ and $\delta y$ may be calculated by calculating apparatus separately provided in the factory and a result thereof may be stored to the phase difference data storing portion 202 of the electronic azimuth meter 101.

The electronic azimuth meter 101 is further provided with a maximum and minimum data storing portion 140 in place of the four azimuth data storing portion 40. The maximum and minimum data storing portion 140 stores the maximum value $Vx_M$ and the minimum value $Vx_m$ of the X-direction magnetic field detected value Vx as well as the maximum value $Vy_M$ and the minimum value $Vy_m$ of the Y-direction magnetic field detected value Vy.

The X-direction approximate equation storing portion 151 stores Equation (3), Equation (5), Equation (7), Equation (12), Equation (13) and Equation (1) described above with regard to the X direction and the Y-direction approximate equation storing portion 152 stores Equation (4), Equation (6), Equation (9), Equation (10), Equation (11) and Equation (2) described above with regard to the Y direction.

Procedure of an initial setting processing in the factory in correspondence with FIG. 10 in the case of the first embodiment, is indicated by a flowchart as shown by FIG. 18 when the electronic azimuth meter 101 is used. That is, first, at steps S191, S192, S193, S194, there are detected the X-direction and the Y-direction magnetic field detected values $Vx\{0\}$, $Vy\{0\}$, $Vx\{90\}$, $Vy\{90\}$, $Vx\{180\}$, $Vx\{270\}$ and $Vy\{270\}$ when the electronic azimuth meter 101 is directed in predetermined four azimuths in a horizontal face.

Next, at step S195, from the four azimuth data $Vx\{0\}$, $Vy\{0\}$, $Vx\{90\}$, $Vy\{90\}$, $Vx\{180\}$, $Vy\{180\}$, $Vx\{270\}$ and $Vy\{270\}$, based on Equation (16) and Equation (17), by the phase difference data calculating portion 201, the phase difference data $\delta x$ and $\delta y$ are calculated, further, from the four azimuth magnetic field detected values $Vx\{0\}$, $Vy\{0\}$, $Vx\{90\}$, $Vy\{90\}$, $Vx\{180\}$, $Vy\{180\}$, $Vx\{270\}$ and $Vy\{270\}$, by using following equations, that is, Equation (19), Equation (20), Equation (21) and Equation (22), the maximum value $Vx_M$ and the minimum value $Vx_m$ of the X-direction magnetic field detected value and the maximum value $Vy_M$ and the minimum value $Vy_m$ of the Y-direction magnetic field detected value are calculated.

$$Vx_M = (Vx\{0\} - Vx\{180\})/2 \cos \delta x + (Vx\{0\} + Vx\{180\})/2 \quad \text{Equation (19)}$$

$$Vx_m = -(Vx\{0\} - Vx\{180\})/2 \cos \delta x + (Vx\{0\} + Vx\{180\})/2 \quad \text{Equation (20)}$$

$$Vy_M = -(Vy\{90\} - Vy\{270\})/2 \cos \delta y + (Vy\{90\} + Vy\{270\})/2 \quad \text{Equation (21)}$$

$$Vy_m = -(Vy\{90\} - Vy\{270\})/2 \cos \delta y + (Vy\{90\} + Vy\{270\})/2 \quad \text{Equation (22)}$$

Further, at step S196, the maximum and the minimum values $Vx_M$ and $Vx_m$ of the X-direction magnetic field detected value as well as the maximum and the minimum value, $Vy_M$ and $Vy_m$ of the Y-direction magnetic field detected value are stored to the maximum and minimum data storing portion 140 and the phase difference data $\delta x$ and $\delta y$ are stored to the phase difference data storing portion 202. Further, there are stored Equation (1) through Equation (13) related to the X-direction and the Y-direction approximate equation storing portions 151 and 152. Further, it may be regarded that the calculating equations of Equation (1) through Equation (13) only include detected values as parameters and the calculating equations per se do not change by the detected values and the calculating equations may be stored previously ROM as a portion of computer program when desired.

Conversely, when all of calculation results of calculatable portions of, for example, Equation (3) through Equation (6), that is, $\{(Vx_M)+(Vx_m)\}/2$, $\{(Vy_M)+(Vy_m)\}/2$, $2/\{(Vx_M)-(Vx_m)\}$ and $2/\{(Vy_M)-(Vy_m)\}$, are stored to the related approximate equation storing portions 151 and 152 as numerical values, the maximum and the minimum values $Vx_M$, and $Vx_m$, of the X-direction magnetic field detected value as well as the maximum and the minimum values $Vy_M$ and $Vy_m$ of the Y-direction magnetic field detected value, may not be stored since expect the case of being utilized as area data, the values are not utilized otherwise as parameters of the calculating equations or the like. Further, calculation of these is carried out the approximate equation calculating portion 155 of FIG. 17.

Referring back to FIG. 17, the approximate equation selecting and processing portion 160 calculates the magnetic fields Bxn and Byn produced by normalizing the X-direction and the Y-direction magnetic fields Bx and By from the magnetic field detected values Vx and Vy by the X-direction and the Y-direction magnetic sensors 21 and 22 based on the phase difference data δx and δy stored to the phase difference data storing portion 202, the maximum and the minimum magnetic field detected values $Vx_M$, $Vx_m$, $Vy_M$, $Vy_m$ in the X direction and the Y direction stored to the maximum and minimum data storing portion 140 and the above-described equations stored to the approximate equation storing portions 151 and 152. Further, substantially similar to the azimuth calculating portion 70 of FIG. 1, the azimuth calculating portion 170 calculates the azimuth angle φ or the like based on Equation (18), mentioned above, from the normalized magnetic fields Bxn and Byn in correspondence with the X-direction and the Y-direction magnetic fields Bx and By and the azimuth angle φ or the like is displayed by the display portion 30.

A processing of determining the X-direction and the Y-direction magnetic fields Bx and By, further particularly, Bxn and Byn by the approximate equation selecting and processing portion 160 of the electronic azimuth meter 101 and processings of calculating and displaying azimuth angle by the azimuth angle calculating portion 170 and the display portion 30 thereafter are carried out in accordance with a flowchart of FIG. 19 in correspondence with FIG. 11 in the case of the first embodiment.

That is, first, at step S20, when outside magnetic fields Bxn and Byn actually applied at locations of the sensors 21 and 22 are detected and outputted as the magnetic field detected values Vx and Vy by the X-direction and the Y-direction magnetic sensors 21 and 22 of the magnetic sensor 20, at step S150, similar to step S40 of FIG. 11, by Equation (5) and Equation (6), further particularly, by Equation (3) and Equation (5), Vxn providing a value of determination is calculated and Vyn providing a value of determination is calculated by Equation (4) and Equation (6). However, in this example, in Equation (3) and Equation (4) in place of the reference middle value $\{(Vx_M)+(Vx_m)\}/2$, a difference from the reference middle value is already calculated.

Next, at step S161, actually similar to step S61 of FIG. 11, whether Vxn<0 is determined, when Vxn is negative, the operation proceeds to step S163 and Equation (9), further particularly, Equation (8) and Equation (9) are selected. That is, in the case of Vxn<0, the phase angle (here βy) taking angle in conformity with the phase shift δx of Vxn as in Equation (8) is to fall in a range of 90 degree through 270 degree. Meanwhile, αy calculated by Equation (8) is to be taken out as an angle in a range of −90 degree through +90 degree. Therefore, in order to provide an angle in a range of 90 degree through 270 degree by the phase angle βy, as in Equation (9), βy=180−αy may be adopted and by Equation (9), corresponding phase angle βy is provided.

When not Vxn<0 but Vxn≧0 at step S161, the operation proceeds from step S161 to step S162, whether Vyn is negative is determined, in the case of Vyn≧0, the operation proceeds to step S162a and Equation (10), further particularly, Equation (8) and Equation (10) are selected. That is, in the case of Vxn≧0, as in Equation (8), phase angle (here, βy) taking angle in conformity with the phase shift δx of Vxn is to fall in a range of 0 degree through 90 degree or 270 degree through 360 degree (Condition 1). Further, in the case of Vyn≧0, the phase angle βy is to fall in a range of 0 degree through 180 degree (condition 2). Therefore, a range satisfying both of condition 1 and condition 2 is provided by 0 degree through 90 degree. Meanwhile, αy calculated by Equation (8) is to be taken out as an angle in a range of −90 degree through +90 degree. In order to provide the range 0 degree to 90 degree by βy, as in Equation (10), βy=αy and by Equation (10), corresponding phase angle βy is provided.

Further, when it is determined that Vyn<0 at step S162, the operation proceeds to step S162b and Equation (11), further particularly, Equation (8) and Equation (11) are selected. That is, in the case of Vxn≧0, as in Equation (8), phase angle (here, βy) taking angle in conformity with the phase shift δx of Vxn is to fall in a range of 0 degree through 90 degree or 270 degree through 360 degree (condition 1). Further, in the case of Vyn<0, the phase angle βy is to fall in a range of 180 degree through 360 degree (condition 3). Therefore, a range of satisfying both of condition 1 and condition 3 is 270 degree through 360 degree. Meanwhile, αy calculated by Equation (8) is to be taken out as angle in a range of −90 degree through +90 degree. In order to provide angle in a range of 270 degree through 360 degree by phase angle βy, as in Equation (11), βy=αy+360 and by Equation (11), corresponding phase angle βy is provided.

When the phase angle βy is provided by step S162a, S162b or S163, described above, the operation proceeds to step S164 and based on Equation (2), the Y-direction magnetic field component By, further particularly, the normalized Y-direction magnetic field component Byn of the geomagnetism is calculated. Here, as δy, a value previously calculated from Equation (17) and stored to the phase difference storing portion 202 is used.

Next, the operation proceeds to step S165, whether the Y-direction magnetic field detected value Vy, further particularly, the normalized Y-direction magnetic field detected value Vyn is positive, is checked (further, at step S165, in place of Vyn, similar to step S65 of FIG. 10, By or Byn may be used). At step S165, when Vyn is positive, the operation proceeds to step S166, and Equation (12), further particularly, Equation (7) and Equation (12) are selected. That is, in the case of Vyn<0, as in Equation (7), phase angle (here, βx) taking angle in conformity with the phase shift δy of Vyn is to fall in a range of 180 degree through 360 degree. Meanwhile, αx calculated by Equation (7) is to be taken out as angle in a range of 0 degree through 180 degree. Therefore, in order to provide angle in a range of 0 degree through 180 degree by the phase angle βx, as in Equation (12), βx=360−αx and by Equation (12), corresponding phase angle βx is provided.

Meanwhile, when Vyn is not negative, the operation proceeds to step S167 and Equation (13), further particularly, Equation (7) and Equation (13) are selected. That is, in the case of Vyn≧0, as in Equation (7), phase angle (here, βx) taking angle in conformity with the phase difference δy of Vyn is to fall in a range of 0 degree through 180 degree. Meanwhile, αx calculated by Equation (7) is to be taken out as angle in a range of 0 degree through 180 degree. Therefore, in order to provide angle in a range of 0 degree through 180 degree by the phase angle βx, as in Equation (13), αx may be replace by βx as it is and by Equation (13), corresponding phase angle βx is provided.

When the phase angle βx is provided by step S166 or S167, mentioned above, the operation proceeds to step S168 and based on Equation (1), the X-direction magnetic field component Bx, further particularly, normalized X-direction magnetic field component Bxn of the geomagnetism is calculated. As δx of Equation (1), a value previously calculated and stored to the phase difference storing portion 202 is used from Equation (16).

When Bx and By, further particularly, Bxn and Byn are calculated as described above, next, the operation proceeds to step S170 and similar to step S70 of FIG. 10, by the azimuth calculating portion 170 (FIG. 17), the azimuth angle φ is calculated from Equation (18). Further, the azimuth angle φ is converted into geographical azimuth angle θ and is displayed by the display portion 30 (FIG. 17) at step S30 along with corresponding azimuth display.

Next, an explanation will be given of calibration by using the electronic azimuth meter 101. The electronic azimuth meter 101 is provided with a minimum and maximum data and approximate equation update control portion 141 in place of the four azimuth data and approximate equation update control portion 41 of the electronic azimuth meter 1 in FIG. 1. The update control portion 141 can be used not only in updating or calibration but also in providing and storing initial data in the factory. As mentioned above, when the maximum and minimum data, that is, the maximum and the minimum values $Vx_M$ and $Vx_m$ of the X-direction magnetic field detected value as well as the maximum and the minimum values $Vy_M$ and $Vy_m$ of the Y-direction magnetic field detected value, are stored to the maximum and minimum data storing portion 140 and the calculation processing of FIG. 19, mentioned above, including Equation (3) through Equation (6), is carried out in measuring the azimuth, the maximum and minimum data of approximate equation update control portion 141 may operate as a maximum and minimum data update control portion and update control of the approximate equations is not carried out. Meanwhile, when calibration is carried out by sampling again the maximum and the minimum data, as mentioned above, when calculation of a portion of Equation (3) through Equation (6) is carried out, the maximum and minimum data approximate equation update control portion 141 may operate as an approximate equation update control portion, as mentioned above, for a purpose of other than updating the area data of the area data storing portion 140a in accordance with request, when the maximum and minimum data are not used, the maximum and minimum data storing portion 140 may be dispensed with.

A brief explanation will be given here of calibration in the case of updating content of the maximum and minimum data storing portion 140 in reference to FIG. 20.

In calibration, the user slowly rotates the electronic azimuth meter 101 while holding the electronic azimuth meter 101 horizontally after providing update start instruction to the electronic azimuth meter 101 by depressing an update start button. At this occasion, according to the maximum and minimum data update control portion 141, the X-direction and the Y-direction magnetic field detected values Vx and Vy initially provided from the sensor 20, are regarded respectively as transitional maximum value and minimum value and stored to respective work areas and therefore, it is continuously determined whether the detected values Vx and Vy continuously provided from the sensor 20 are larger than the transitional maximum values in the X and Y directions and whether the detected values Vx and Vy are smaller than the transitional minimum values in the X and the Y directions and when the transitional values coincide with conditions, the transitional values are updated by new values, which is repeated until finishing one rotation. Thereby, as shown by steps S197a, S197b, S197c and S197d, the maximum values $Vx_M$ and $Vy_M$ of the magnetic field detected values in the X direction and the Y direction as well as the minimum values $Vx_m$ and $Vy_m$ of the magnetic field detected values in the X direction and the Y direction are detected. Further, the order of detecting $Vx_M$, $Vy_M$, $Vx_m$ and $Vy_m$ is dependent upon from which azimuth the rotation is started and to which direction the azimuth meter is rotated and therefore, the order of steps S197a, S197b, S197c and S197d differs depending on cases. When the one rotation is finished and the maximum values and the minimum values of the magnetic field detected values in the X direction and the Y direction are firmly determined, these values are stored to the maximum and minimum data storing portion 140 under control of the maximum and minimum data update control portion 141 (step S199).

In this way, according to the electronic azimuth meter 101, the updating operation is finished by only updating $Vx_M$, $Vy_M$, $Vx_m$ and $Vy_m$, and when the azimuth measurement is carried out successively, the updated maximum and minimum data $Vx_M$, $Vy_M$, $Vx_m$ and $Vy_m$ may be taken out and the azimuth measurement may be carried out by the procedure shown by FIG. 19.

Further, from the above-described characteristic FT1, the following equation is provided.

$$Vxn^2 + Vyn^2 - 2 Vxn Vyn \cdot \sin(\delta x - \delta y) = \cos^2(\delta x - \delta y)$$

The equation constitutes an ellipse in which the long axis and the short axis are inclined relative to axes Vxn and Vyn by 45 degree in a Vxn−Vyn orthogonal coordinate system. Therefore, based on the equation representing the ellipse, the azimuth angle φ may be calculated directly or indirectly.

The electronic azimuth meter according to the invention is provided with "approximate equation storing means stored with pluralities, with regard to the respective directions X and Y, of the approximate equation calculated based on the magnetic field detected values Vx and Vy of the X-direction and the Y-direction magnetic sensors with regard to a number of azimuths of the azimuth meter in the geomagnetism of the magnetic field components Bx and By, which are approximate equations representing relationships between the detected values Vx and Vy of the magnetic sensors and the magnetic field components Bx and By of the geomagnetism (for example, Vxi(Bx,By), Vyj(Bx,By) or Bxi(Vx, Vy), Byj (Vx, Vy)) and azimuth calculating means for calculating azimuth of the azimuth meter main body by selecting specific approximate equation in the pluralities of approximate equations (for example, Vxi(Bx,By), Vyj(Bx, By) or Bxi(Vx, Vy), Byj(Vx, Vy)) with regard to the respective direction X and Y, based on the detected values Vx and Vy of the X-direction and the Y-direction magnetic sensors"

and accordingly, even when there is "a magnetic part magnetized by the geomagnetism and forming the magnetic fields Bmx and Bmy having components in oblique directions relative to the direction of the geomagnetism specified by the magnetic field components Bx and By in an X-Y plane, at locations of the X-direction and the Y-direction magnetic sensors," influence by the magnetic part is removed, the magnetic field components of the geomagnetism are detected and the azimuth of the azimuth meter can accurately be calculated. Further, for calculating accurate azimuth, there is no need of knowing what noise magnetic field is formed by which part.

According to the electronic azimuth meter of the invention, the magnetic part can be arranged to be proximate to the magnetic sensor and therefore, not only the size of the azimuth meter main body can be minimized but also the battery capable of being contained to the case and having the maximum capacity can be used and the electronic azimuth meter can be made compact and operable for a long period of time.

What is claimed is:

1. An electronic azimuth meter comprising:

a main body;

X-direction and Y-direction magnetic sensors disposed in the main body for detecting magnetic field components in two orthogonal directions comprising X and Y axes of the main body;

a magnetic part disposed in or comprising the main body which deforms a magnetic field incident on the X-direction and the Y-direction magnetic sensors and forms deformed magnetic field components Bmx and Bmy at locations of the N-direction and the Y-direction magnetic sensors by being magnetized by geomagnetism, the magnetic field components Bmx and Bmy having components in oblique directions relative to a direction of the geomagnetism specified by magnetic field components Bx and By in an X-Y plane;

an approximate equation storing circuit for storing, with regard to the respective directions of N and Y, a plurality of approximate equations calculated based on magnetic field values Vx and Vy detected by the N-direction and Y-direction magnetic sensors with regard to a number of azimuths of the azimuth meter in the geomagnetism specified by the magnetic field components Bx and By, the approximate equations representing relationships between the detected values Vx and Vy of the magnetic sensors and the magnetic field components Bx and By of the geomagnetism; and an azimuth calculating circuit for calculating the azimuth of the main body by selecting specific approximate equations from the plurality of approximate equations with regard to the respective directions of N and Y based on the detected values Vx and Vy of the N-direction and Y-direction magnetic sensors.

2. The electronic azimuth meter according to claim 1; wherein the magnetic part includes a case and a battery arranged at a center of the case.

3. The electronic azimuth meter according to claim 1; wherein the azimuth calculating circuit calculates the magnetic field components Bx and By of the geomagnetism in the X and the Y directions and calculates the azimuth of the azimuth meter based on the magnetic field components Bx and By of the geomagnetism.

4. The electronic azimuth meter according to claim 3; wherein respective ones of the plurality of approximate equations with regard to the detected value Vx of the X-direction magnetic sensor specify the relationship between the detected value Vx and the X-direction magnetic field component Bx of the geomagnetism, and respective ones of the plurality of approximate equations with regard to the detected value Vy of the Y-direction magnetic sensor specify the relationship between the detected value Vy and the Y-direction magnetic field component By of the geomagnetism.

5. The electronic azimuth meter according to claim 4; wherein the azimuth calculating circuit compares a large or small relationship between the detected value of one of the X-direction and the Y-direction magnetic sensors and a first reference value and selects one approximate equation from the plurality of approximate equations with regard to the other one of the X-direction and Y-direction magnetic sensors based on a result of the comparison, calculates the magnetic field component in a corresponding direction of the geomagnetism based on the approximate equations and compares a large or small relationship between the magnetic field components and a second reference value and selects one approximate equation from the plurality of approximate equations with regard to the one magnetic sensor based on a result of the comparison.

6. The electronic azimuth meter according to claim 5; wherein the approximate equation storing circuit includes a four azimuth data storing portion for storing the magnetic field values detected by the X-direction and the Y-direction magnetic sensors with regard to four azimuths in east, west, south and north directions of the geomagnetism.

7. The electronic azimuth meter according to claim 5; wherein the first reference value is an average value of the magnetic field values detected by the one magnetic sensor and stored in the four azimuth data storing portion with regard to two azimuths in reverse directions of the four azimuths of east, west, south and north directions of the geomagnetism, and the second reference value is zero.

8. The electronic azimuth meter according to claim 7; further comprising an updating circuit for updating the magnetic field detected values of the four azimuths of east, west, south and north of the geomagnetism stored to the four azimuth data storing portion; and wherein the approximate equation calculating circuit calculates approximate equations in the X-direction and the Y-direction based on the magnetic field detected values of the four azimuths of east, west, south and north directions of the geomagnetism stored to the four azimuth data storing portion.

9. The electronic azimuth meter according to claim 4; wherein the azimuth calculating circuit compares a large or small relationship between the detected value of one of the X-direction and Y-direction magnetic sensors and a first reference value and selects one of the plurality of approximate equations with regard to the other one of the X-direction and Y-direction magnetic sensors based on a result of the comparison, calculates the magnetic field component in a corresponding direction of the geomagnetism based on the approximate equation, compares a large or small relationship between the magnetic field component of the detected value of the one magnetic sensor and a second reference value and selects one of the plurality of approximate equations with regard to the one magnetic sensor based on a result of the comparison.

10. The electronic azimuth meter according to claim 4; wherein the approximate equation storing circuit includes a phase difference data storing portion for storing phase difference data $\delta x$ and $\delta y$ in the X-direction and the Y-direction calculated from the magnetic field values detected by the X-direction and the Y-direction magnetic sensors with regard to four azimuths of east, west, south and north directions of the geomagnetism and the approximate equations in the X direction and the Y direction are respectively constituted by a cosine function and a sine function including δx and δy.

11. The electronic azimuth meter according to claim 10; wherein the approximate equation storing circuit includes a maximum and minimum data storing portion for storing maximum values VxM and VyM and minimum values Vxm and Vym of the magnetic field detected values of the X-direction and the Y-direction magnetic sensors, the approximate equation in the X direction is specified by the maximum value VxM and minimum value of Vxm of the magnetic field detected values of the X-direction magnetic sensor and the phase difference δx in the X direction and the approximate equation in the Y direction is specified by the maximum values VyM and the minimum value Vym of the magnetic field detected values of the Y-direction magnetic sensor and the phase difference δy in the Y direction.

12. The electronic azimuth meter according to claim 11; further comprising an updating circuit for updating the maximum values and the minimum values of the X-direction and the Y-direction magnetic field detected values stored in the maximum and minimum data storing portion.

13. An electronic timepiece having a housing, a timepiece movement, a display, and an azimuth meter; wherein the azimuth meter comprises the electronic azimuth meter according to claim 1.

14. An electronic azimuth meter comprising: a magnetic sensor for detecting a magnetic field; a main body in which the magnetic sensor is disposed and having a magnetic part magnetized by geomagnetism to deform a magnetic field; and an azimuth calculating circuit for calculating the azimuth of the main body by solving an approximate equation from a plurality of approximate equations based on a detected magnetic field value by the magnetic sensor, the approximate equation being one of a plurality of approximate equations representing relationships between magnetic field values detected by the magnetic sensors and magnetic field components of the geomagnetism.

15. An electronic azimuth meter according to claim 14; wherein the magnetic sensor comprises X-direction and Y-direction magnetic sensors for detecting magnetic field components in two orthogonal directions comprising X and Y axes of the main body.

16. An electronic azimuth meter according to claim 15; wherein the magnetic part forms deformed magnetic field components Bmx and Bmy at locations of the X-direction and the Y-direction magnetic sensors by being magnetized by geomagnetism, the magnetic field components Bmx and Bmy having components in oblique directions relative to a direction of the geomagnetism specified by magnetic field components Bx and By in an X-Y plane.

17. An electronic azimuth meter according to claim 16; wherein the plurality of approximate equations include a plurality of approximate equations that specify the relationship between the detected value Vx and the X-direction magnetic field component Bx of the geomagnetism, and a plurality of approximate equations that specify the relationship between the detected value Vy and the Y-direction magnetic field component By of the geomagnetism.

18. An electronic azimuth meter according to claim 17; wherein the azimuth calculating circuit compares a large or small relationship between the detected value of one of the X-direction and the Y-direction magnetic sensors and a first reference value, selects one approximate equation from the plurality of approximate equations with regard to the other one of the X-direction and Y-direction magnetic sensors based on a result of the comparison, calculates the magnetic field component in a corresponding direction of the geomagnetism based on the approximate equations, compares a large or small relationship between the magnetic field components and a second reference value, and selects one approximate equation from the plurality of approximate equations with regard to the one magnetic sensor based on a result of the comparison.

19. An electronic azimuth meter according to claim 18; wherein the approximate equation storing circuit includes a four azimuth data storing portion for storing the magnetic field values detected by the X-direction and the Y-direction magnetic sensors at four azimuths in east, west, south and north directions of the geomagnetism.

20. An electronic azimuth meter according to claim 19; wherein the first reference value is an average value of the magnetic field values detected by the one magnetic sensor and stored in the four azimuth data storing portion with regard to two azimuths in reverse directions of the four azimuths of east, west, south and north directions of the geomagnetism, and the second reference value is zero.

21. An electronic azimuth meter according to claim 20; further comprising an updating circuit for updating the detected magnetic field values at the four azimuths of east, west, south and north of the geomagnetism stored in the four azimuth data storing portion; and wherein the approximate equation calculating circuit calculates approximate equations in the X-direction and the Y-direction based on the detected magnetic field values at the four azimuths of east, west, south and north directions of the geomagnetism stored in the four azimuth data storing portion.

22. An electronic azimuth meter according to claim 17; wherein the azimuth calculating circuit compares a Large or small relationship between the detected value of one of the X-direction and Y-direction magnetic sensors and a first reference value and selects one of the plurality of approximate equations with regard to the other one of the X-direction and Y-direction magnetic sensors based on a result of the comparison, calculates the magnetic field component in a corresponding direction of the geomagnetism based on the approximate equation, compares a large or small relationship between the magnetic field component of the detected value of the one magnetic sensor and a second reference value, and selects one of the plurality of approximate equations with regard to the one magnetic sensor based on a result of the comparison.

23. An electronic azimuth meter according to claim 17; wherein the approximate equation storing circuit includes a phase shift data storing portion for storing phase shift data δx and δy in the X-direction and the Y-direction calculated from the magnetic field values detected by the X-direction and the Y-direction magnetic sensors with regard to four azimuths of east, west, south and north directions of the geomagnetism, and the approximate equations in the X direction and the Y direction respectively comprise a cosine function and a sine function including the phase shift values δx and δy.

24. An electronic azimuth meter according to claim 23; wherein the approximate equation storing circuit includes a maximum and minimum data storing portion for storing maximum values VxM and VyM and minimum values Vxm and Vym of the magnetic field values detected by the X-direction and the Y-direction magnetic sensors, the approximate equation in the X direction is specified by the maximum value VxM and the minimum value of Vxm of the magnetic field values detected by the X-direction magnetic sensor and the phase shift δx in the X direction, and the approximate equation in the Y direction is specified by the maximum values VyM and the minimum value Vym of the magnetic field values detected by the Y-direction magnetic sensor and the phase shift δy in the Y direction.

25. An electronic azimuth meter according to claim 24; further comprising an updating circuit for updating the maximum values and the minimum values of the X-direction and the Y-direction magnetic field detected values stored in the maximum and minimum data storing portion.

* * * * *